(12) United States Patent
Jia et al.

(10) Patent No.: US 12,356,457 B2
(45) Date of Patent: Jul. 8, 2025

(54) METHOD AND APPARATUS FOR INDICATING AN LBT FAILURE

(71) Applicant: FUJITSU LIMITED, Kawasaki (JP)

(72) Inventors: Meiyi Jia, Beijing (CN); Qinyan Jiang, Beijing (CN); Guorong Li, Beijing (CN); Yang Lu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 320 days.

(21) Appl. No.: 17/939,038

(22) Filed: Sep. 7, 2022

(65) Prior Publication Data

US 2023/0007693 A1 Jan. 5, 2023

Related U.S. Application Data

(63) Continuation of application No. PCT/CN2020/084072, filed on Apr. 9, 2020.

(51) Int. Cl.
*H04W 74/08* (2024.01)
*H04W 72/12* (2023.01)
(Continued)

(52) U.S. Cl.
CPC ... *H04W 74/0825* (2013.01); *H04W 72/1268* (2013.01); *H04W 74/0833* (2013.01)

(58) Field of Classification Search
CPC ... H04W 28/04; H04W 72/04; H04W 72/042; H04W 88/08; H04W 74/0825; H04W 72/1268; H04W 74/0833; H04L 5/0007
(Continued)

(56) References Cited

U.S. PATENT DOCUMENTS 11,632,794 B2 * 4/2023 Tsai ............... H04L 27/0006
370/329
11,638,302 B2 * 4/2023 Thyagarajan ..... H04W 74/0816
370/329
(Continued)

FOREIGN PATENT DOCUMENTS

CN 105580292 A * 5/2016 ........ H04W 74/0833
CN 107371168 A * 11/2017 ............ H04W 16/14
(Continued)

OTHER PUBLICATIONS

3GPP TSG-RAN2 Meeting #106, Reno, USA, May 13-17, 2019, TDoc R2-1907605, Chane Request, current version 15.5.0, Title: Update to RACH counters and SR counter when LBT failure, Source to WG: Ericsson, Source to TSG: R2, Work item code: NR_unlic-Core, Date May 13, 2019, Rel-16. (Year: 2019).*
(Continued)

*Primary Examiner* — Peter G Solinsky
*Assistant Examiner* — Sanjay K Dewan
(74) *Attorney, Agent, or Firm* — Myers Wolin, LLC

(57) ABSTRACT

Method and apparatus for indicating an LBT failure. The method is applicable to a terminal equipment and includes: in a case where a lower layer or a higher layer determines that a first condition and/or a second condition are/is satisfied, notifying or indicating the LBT failure by the lower layer to the higher layer; and/or in a case where the lower layer or the higher layer determines that the first condition and/or a third condition are/is not satisfied, not notifying or indicating the LBT failure by the lower layer to the higher layer, or stopping notifying or indicating the LBT failure by the lower layer to the higher layer.

19 Claims, 15 Drawing Sheets

(51) Int. Cl.
*H04W 72/1268* (2023.01)
*H04W 74/0808* (2024.01)
*H04W 74/0833* (2024.01)

(58) Field of Classification Search
USPC .......................................................... 370/329
See application file for complete search history.

(56) References Cited

U.S. PATENT DOCUMENTS

| | | | | |
|---|---|---|---|---|
| 11,743,942 | B2* | 8/2023 | Babaei | H04W 74/0808 370/329 |
| 2016/0127098 | A1* | 5/2016 | Ng | H04L 5/001 370/329 |
| 2016/0212770 | A1 | 7/2016 | Lee et al. | |
| 2017/0142754 | A1 | 5/2017 | Uziel et al. | |
| 2017/0289869 | A1* | 10/2017 | Nogami | H04W 36/0077 |
| 2021/0007146 | A1* | 1/2021 | Agiwal | H04W 76/15 |
| 2021/0014899 | A1* | 1/2021 | Shih | H04B 17/318 |
| 2021/0112592 | A1 | 4/2021 | Lee et al. | |
| 2021/0212112 | A1 | 7/2021 | Jia et al. | |
| 2021/0345405 | A1 | 11/2021 | Kim et al. | |
| 2022/0070698 | A1 | 3/2022 | Jiang | |
| 2022/0110153 | A1 | 4/2022 | Wu et al. | |
| 2023/0102314 | A1* | 3/2023 | Myung | H04L 5/00 370/329 |
| 2023/0128601 | A1* | 4/2023 | Noh | H04L 5/0092 370/329 |
| 2023/0156817 | A1* | 5/2023 | Wang | H04W 74/0841 370/329 |

FOREIGN PATENT DOCUMENTS

| | | | | |
|---|---|---|---|---|
| CN | 108476532 | A * | 8/2018 | ............ H04W 74/08 |
| CN | 109845383 | A * | 6/2019 | ............ H04W 74/00 |
| CN | 109863777 | A * | 6/2019 | ........ H04W 74/0808 |
| CN | 110945949 | A * | 3/2020 | ........ H04W 74/0808 |
| IN | 201841022151 | A | 12/2019 | |
| JP | WO2020061866 | A1 * | 4/2020 | .......... H04W 74/002 |
| KR | 1020200035822 | A * | 3/2019 | ............ H04W 24/10 |
| KR | 20200035822 | A | 4/2020 | |
| WO | 2019/195563 | A1 | 10/2019 | |
| WO | 2019/240512 | A1 | 12/2019 | |
| WO | 2020/061866 | A1 | 4/2020 | |

OTHER PUBLICATIONS

3GPP TSG RAN WG1 #100-e, e-Meeting, Feb. 24-Mar. 6, 2020, R1-2000156, Title: LS on consistent Uplink LBT failure detection mechanism. (Year: 2020).*

Weight Based Channel Selection Towards 5G in the Unlicensed Spectrum, Yu et al., Shanghai Institute of Microsystem and Information Technology (SIMIT), Chinese Academy of Sciences, Shanghai, China, China Communications, Aug. 2018. (Year: 2018).*

3GPP TSG RAN WG2#109-e, Electronic meeting, Feb. 24-Mar. 6, 2020, R2-2002361, Title: LS to RAN2 on NR-U related changes for 38.300 running CR, Release: Rel-16, Work Item: NR_unlic-core, Source: RAN WG1 to RAN WG2, Contact Person:, Name: Jing Sun. (Year: 2020).*

First Notification of Office Action and Search Report issued by the China National Intellectual Property Administration for corresponding Chinese Patent Application No. 202080098279.5, mailed on May 22, 2024, with an English translation.

RAN2, "LS on consistent Uplink LBT failure detection mechanism", Work Item: NR_unlic-Core, 3GPP TSG-RAN WG1 #100-e, R1-2000156, e-Meeting, Feb. 24-Mar. 6, 2020.

Ericsson, "Update to RACH counters and SR counter when LBT failure", Work item code: NR_unlic-Core, 3GPP TSG-RAN2 Meeting #106, TDoc R2-1907605, Reno, USA, May 13-17, 2019.

Zeng et al., "Weight Based Channel Selection Towards 5G in the Unlicensed Spectrum", China Communications, Aug. 2018, pp. 54-66.

International Search Report of the International Searching Authority issued by China National Intellectual Property Administration for corresponding International Patent Application No. PCT/CN2020/084072, dated Dec. 8, 2020, with an English translation.

Notice of Reasons for Refusal issued by the Japan Patent Office for corresponding Japanese Patent Application No. 2022-554269, mailed on Jun. 20, 2023, with an English translation.

RAN WG1, "LS to RAN2 on NR-U related changes for 38.300 running CR", 3GPP TSG RAN WG2 Meeting #109-e, Release: Rel-16, R2-2002361, with Change Request, Electronic meeting, Feb. 24-Mar. 6, 2020.

* cited by examiner

METHOD AND APPARATUS FOR INDICATING AN LBT FAILURE

CROSS-REFERENCE TO RELATED APPLICATION

This application is a continuation application of International Application PCT/CN2020/084072 filed on Apr. 9, 2020, and designated the U.S., the entire contents of which are incorporated herein by reference.

TECHNICAL FIELD

This disclosure relates to the field of communication technologies.

BACKGROUND

In order to provide 3GPP services on unlicensed frequency bands, the following mechanisms are introduced: Listen Before Talk (LBT) and Discovery RS Measurement Timing Configuration (DMTC). A lower layer performs an LBT procedure, and according to an LBT result, when a channel is determined to be occupied, no transmission is performed. When the lower layer performs the LBT procedure before the transmission and the transmission is not performed, that is, when uplink transmission is blocked due to an LBT failure, the lower layer indicates the LBT failure to a higher layer.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In New Radio (NR-U) systems on unlicensed bands, a consistent LBT failure detection and recovery mechanism for uplink transmissions is introduced.

A radio resource control (RRC) layer may configure a consistent LBT failure recovery procedure for a higher layer, such as an MAC entity of an MAC layer. Consistent LBT failure detection is performed on each uplink BWP (bandwidth part). For this purpose, a counter and a timer are introduced. When an uplink LBT failure occurs, the timer is started or restarted. Whenever the higher layer (such as the MAC layer) receives an uplink LBT failure indication from the lower layer (such as a physical layer), the counter is incremented by 1, and when a count value of the counter exceeds a preset value, consistent LBT failure is triggered. Furthermore, when the timer expires, the counter is reset. This procedure may be regarded as a consistent (uplink) LBT failure detection procedure or a part or a step of a consistent (uplink) LBT failure detection procedure.

It was found by the inventors that according to an existing mechanism, in order to realize a consistent LBT failure detection mechanism of uplink transmission of a higher layer, a lower layer needs to provide an indication for an MAC layer, that is, the lower layer notifies or indicates to the higher layer when any uplink transmission is blocked due to the LBT failure or a channel access failure occurs.

However, at the lower layer, uplink transmission including data, control information and a reference signal may occur at any time, and when the lower layer notifies or indicates to the higher layer whenever the uplink transmission is blocked due to the LBT failure, the interaction between the lower layer and the higher layer will be greatly increased, and power consumption of a terminal equipment will also be increased.

In order to solve one or more of the above problems, embodiments of this disclosure provide a method and apparatus for indicating an LBT failure.

According to a first aspect of the embodiments of this disclosure, there is provided an apparatus for indicating an LBT failure, applicable to a terminal equipment, the apparatus including: a first indicating unit configured to, in a case where a lower layer or a higher layer determines that a first condition and/or a second condition are/is satisfied, when uplink transmission is blocked due to an LBT failure, notify or indicate the LBT failure by the lower layer to the higher layer, or start to notify or indicate the LBT failure by the lower layer to the higher layer; and/or a second indicating unit configured to, in a case where the lower layer or the higher layer determines that the first condition and/or a third condition are/is not satisfied, when uplink transmission is blocked due to an LBT failure, not notify or indicate the LBT failure by the lower layer to the higher layer, or stop notifying or indicating the LBT failure by the lower layer to the higher layer.

According to a second aspect of the embodiments of this disclosure, there is provided an apparatus for indicating an LBT failure, applicable to a network device, the apparatus including: a configuring unit configured to configure a higher layer parameter for a terminal equipment, the higher layer parameter being used by the terminal equipment for determining whether a lower layer notifies or indicates an LBT failure to a higher layer.

According to a third aspect of the embodiments of this disclosure, there is provided a terminal equipment, including the apparatus described in the first aspect of the embodiments of this disclosure.

According to a fourth aspect of the embodiments of this disclosure, there is provided a network device, including the apparatus described in the second aspect of the embodiments of this disclosure.

According to a fifth aspect of the embodiments of this disclosure, there is provided a communications system, including the terminal equipment described in the third aspect of the embodiments of this disclosure and/or the network device described in the fourth aspect of the embodiments of this disclosure.

According to a sixth aspect of the embodiments of this disclosure, there is provided a method for indicating an LBT failure, applicable to a terminal equipment, the method including: in a case where a lower layer or a higher layer determines that a first condition and/or a second condition are/is satisfied, when uplink transmission is blocked due to an LBT failure, notifying or indicating the LBT failure by the lower layer to the higher layer, or starting to notify or indicate the LBT failure by the lower layer to the higher layer; and/or, in a case where the lower layer or the higher layer determines that the first condition and/or a third condition are/is not satisfied, when uplink transmission is blocked due to an LBT failure, not notifying or indicating the LBT failure by the lower layer to the higher layer, or stopping notifying or indicating the LBT failure by the lower layer to the higher layer.

According to a seventh aspect of the embodiments of this disclosure, there is provided a method for indicating an LBT failure, applicable to a network device, the method including: configuring a higher layer parameter for a terminal equipment, the higher layer parameter being used by the terminal equipment for determining whether a lower layer notifies or indicates an LBT failure to a higher layer.

According to an eighth aspect of the embodiments of this disclosure, there is provided a computer program, wherein when the program is executed in an apparatus for indicating an LBT failure or a terminal equipment, the program causes the apparatus for indicating an LBT failure or the terminal equipment to carry out the method for indicating an LBT failure as described in the sixth aspect of the embodiments of this disclosure.

According to a ninth aspect of the embodiments of this disclosure, there is provided a storage medium storing a computer program, wherein the computer program causes an apparatus for indicating an LBT failure or a terminal equipment to carry out the method for indicating an LBT failure as described in the sixth aspect of the embodiments of this disclosure.

According to a tenth aspect of the embodiments of this disclosure, there is provided a computer program, wherein when the program is executed in an apparatus for indicating an LBT failure or a network device, the program causes the apparatus for indicating an LBT failure or the network device to carry out the method for indicating an LBT failure as described in the seventh aspect of the embodiments of this disclosure.

According to an eleventh aspect of the embodiments of this disclosure, there is provided a storage medium storing a computer program, wherein the computer program causes an apparatus for indicating an LBT failure or a network device to carry out the method for indicating an LBT failure as described in the seventh aspect of the embodiments of this disclosure.

An advantage of the embodiments of this disclosure exists in that a lower layer or a higher layer first determines whether relevant conditions are satisfied, and based on a result of determination, when the uplink transmission is blocked due to the LBT failure, determines whether the lower layer notifies or indicates the LBT failure to the higher layer, or determines whether the lower layer starts to notify or indicate the LBT failure or stops notifying or indicating the LBT failure to the higher layer, thereby lowering power consumption of the terminal equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
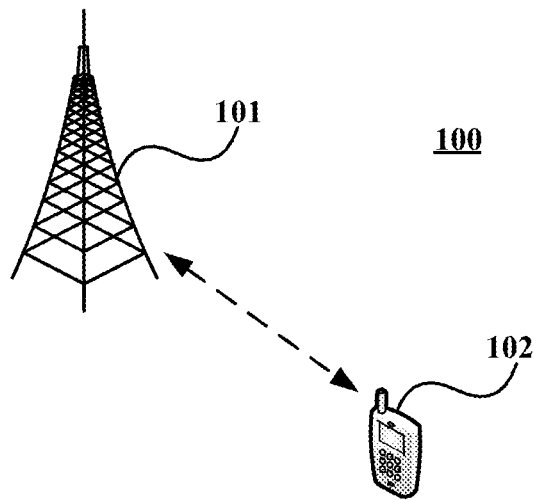
FIG. 1 is schematic diagram of a communications system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communications system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communications system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" refers to, for example, equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiment of this disclosure, "when . . . ", "in a case where . . . ", "for a case where . . . " and "if . . . " all indicate one or some conditions or states are based, and these expressions may be interchangeable.

Scenarios in the embodiments of this disclosure shall be described below by way of examples; however, this disclosure is not limited thereto.

FIG. 1 is a schematic diagram of a communications system of an embodiment of this disclosure, in which a case where a terminal equipment and a network device are taken as examples is schematically shown. As shown in FIG. 1, a communications system 100 may include a network device 101 and a terminal equipment 102. For the sake of simplicity, an example having one terminal equipment only is schematically given in FIG. 1. The network device 101 is, for example, a network device gNB in an NR system.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

Figure 2:
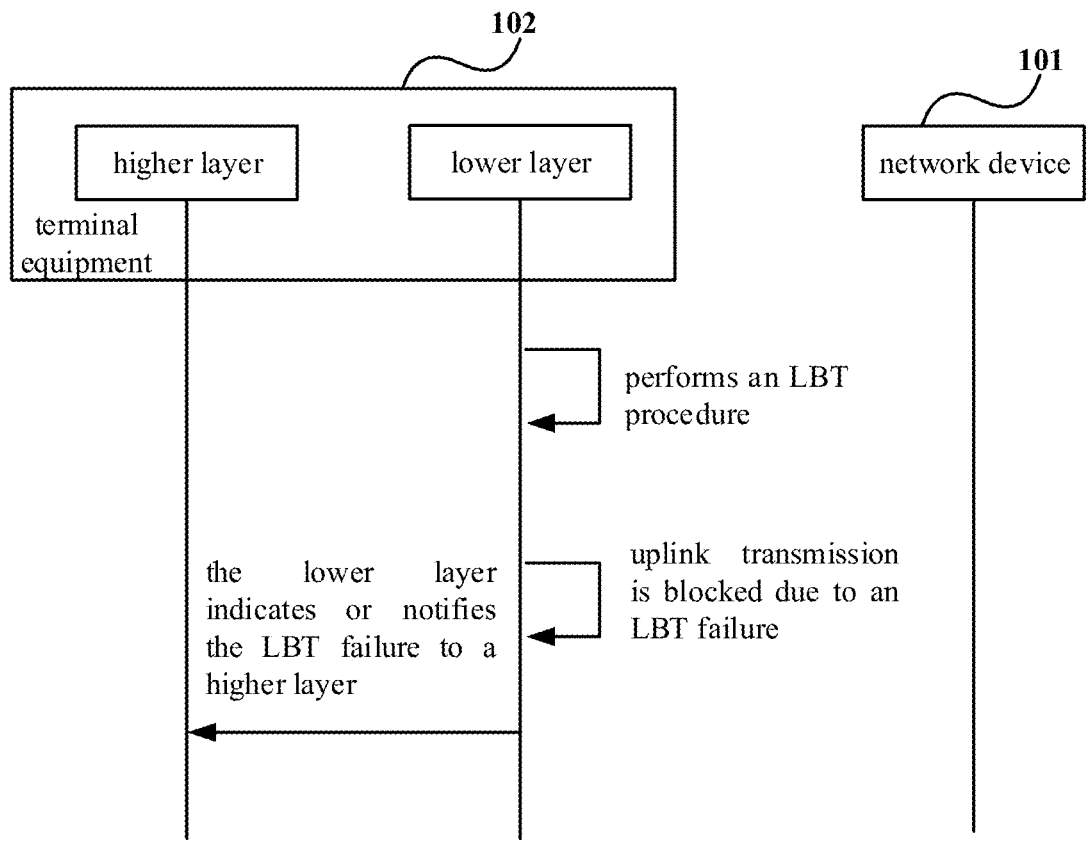
FIG. 2 is a schematic diagram of an existing mechanism for indicating an LBT failure.

When the terminal equipment 102 performs LBT, an LBT failure may occur. FIG. 2 is a schematic diagram of an existing mechanism for indicating an LBT failure. As shown in FIG. 2, a lower layer (e.g. a physical layer) of the terminal equipment 102 performs an LBT procedure, and when the lower layer performs the LBT procedure before uplink transmission and the uplink transmission is not performed, that is, when the uplink transmission is blocked due to an LBT failure, the lower layer indicates or notifies the LBT failure to a higher layer. (e.g. an MAC layer). In this way, whenever the uplink transmission is blocked due to the LBT failure, the lower layer will notify or indicate to the higher layer, which will greatly increase interaction between the lower layer and the higher layer, and increase power consumption of the terminal equipment 102.

Figure 3:
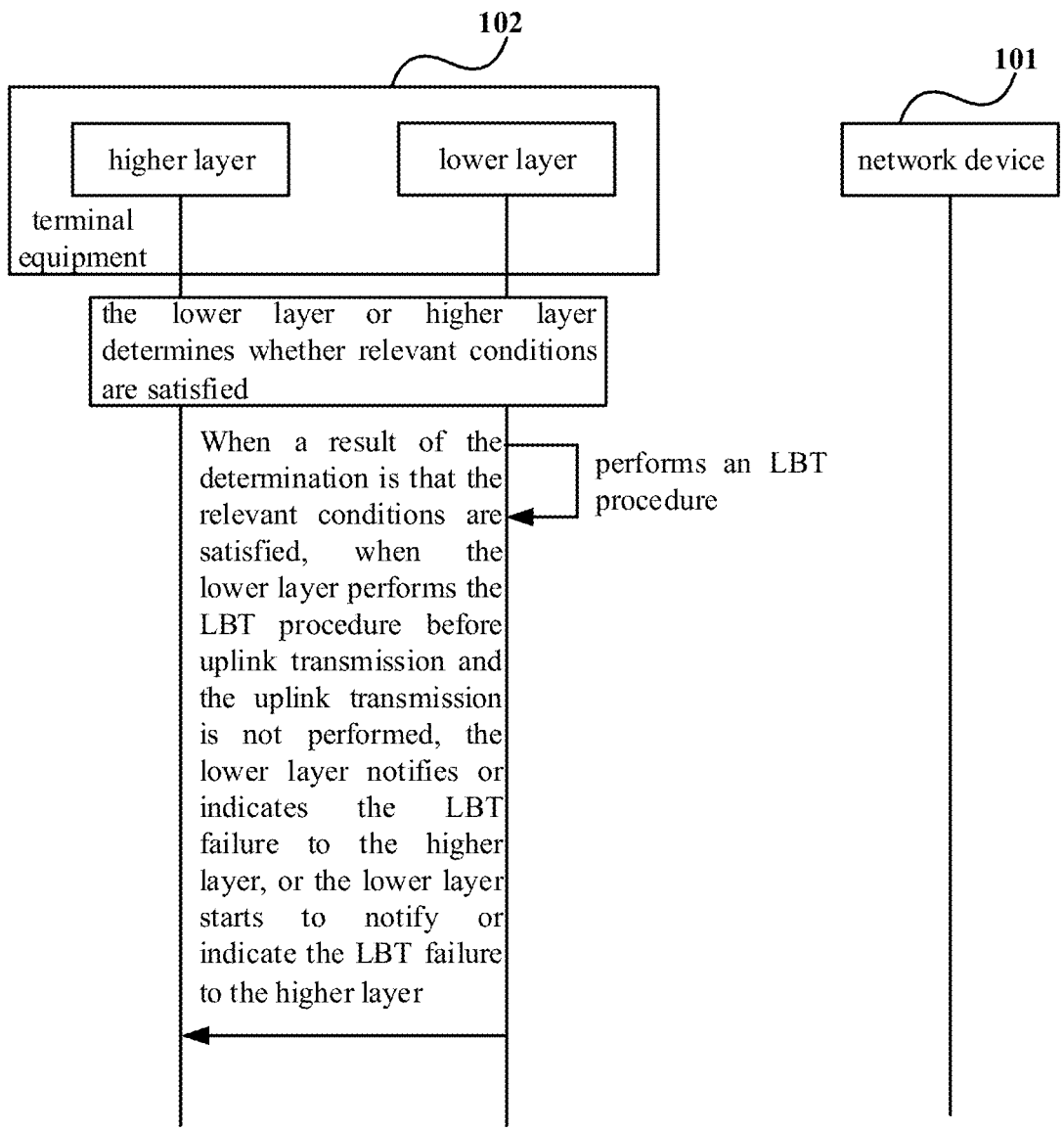
FIG. 3 is a schematic diagram of a mechanism for indicating an LBT failure of an embodiment of this disclosure.

FIG. 3 is a schematic diagram of a mechanism for indicating an LBT failure of an embodiment of this disclosure. As shown in FIG. 3, a lower layer of the terminal equipment 102 performs a LBT procedure, and the lower layer or a higher layer first determines whether relevant conditions are satisfied. When a result of the determination is that the relevant conditions are satisfied, when the lower layer performs the LBT procedure before uplink transmission and the uplink transmission is not performed, that is, when the uplink transmission is blocked due to the LBT failure, the lower layer notifies or indicates the LBT failure to the higher layer, or the lower layer starts to notify or indicate the LBT failure to the higher layer, and when the result of the determination is that the relevant conditions are not satisfied, when the uplink transmission is blocked due to the LBT failure, the lower layer does not notify or indicate the LBT failure to the higher layer, or the lower layer stops notifying or indicating the LBT failure to the higher layer. In this way, interaction between the lower layer and the higher layer may be lowered, and power consumption of the terminal equipment 102 may be reduced.

Various embodiments of this disclosure shall be described below in with reference to the accompanying drawings. These embodiments are illustrative only, and are not intended to limit this disclosure.

Embodiment 1

The embodiment of this disclosure provides a method for indicating an LBT failure, applicable to a terminal equipment.

Figure 4:
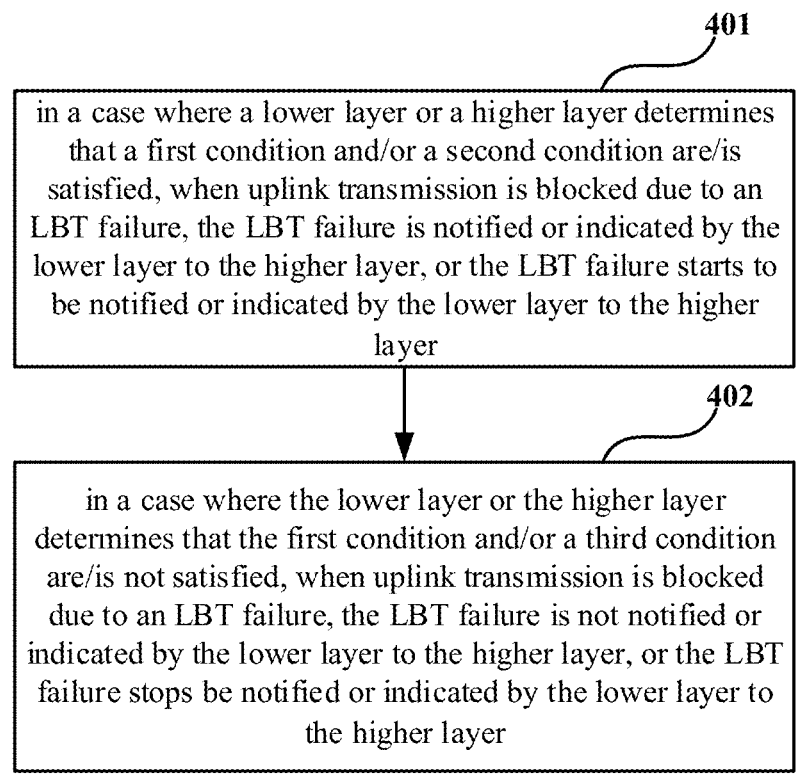
FIG. 4 is a schematic diagram of the method for indicating an LBT failure of Embodiment 1 of this disclosure.

FIG. 4 is a schematic diagram of the method for indicating an LBT failure of Embodiment 1 of this disclosure. As shown in FIG. 4, the method includes:

Step 401: in a case where a lower layer or a higher layer determines that a first condition and/or a second condition are/is satisfied, when uplink transmission is blocked due to an LBT failure, the LBT failure is notified or indicated by the lower layer to the higher layer, or the LBT failure starts to be notified or indicated by the lower layer to the higher layer; and/or, Step 402: in a case where the lower layer or the higher layer determines that the first condition and/or a third condition are/is not satisfied, when uplink transmission is blocked due to an LBT failure, the LBT failure is not notified or indicated by the lower layer to the higher layer, or the LBT failure stops be notified or indicated by the lower layer to the higher layer.

In the embodiment of this disclosure, the method may include one of or both of steps 401 and 402, and when the method includes both of steps 401 and 402, an order of execution of steps 401 and 402 is not limited.

Hence, the lower layer or the higher layer first determines whether relevant conditions are satisfied, and based on a result of the determination, when the uplink transmission is blocked due to the LBT failure, determines whether the lower layer notifies or indicates the LBT failure to the higher layer, or determines whether the lower layer starts to notify or indicate the LBT failure to the higher layer or whether the lower layer stops notifying or indicating the LBT failure to the higher layer. In this way, interaction between the lower layer and the higher layer may be lowered, and power consumption of the terminal equipment may be reduced.

In the embodiment of this disclosure, the lower layer is, for example, a physical layer, and the higher layer is, for example, an MAC layer.

Various cases will be exemplarily described below for whether the specific conditions are satisfied determined by the lower layer or the higher layer.

Figure 5:
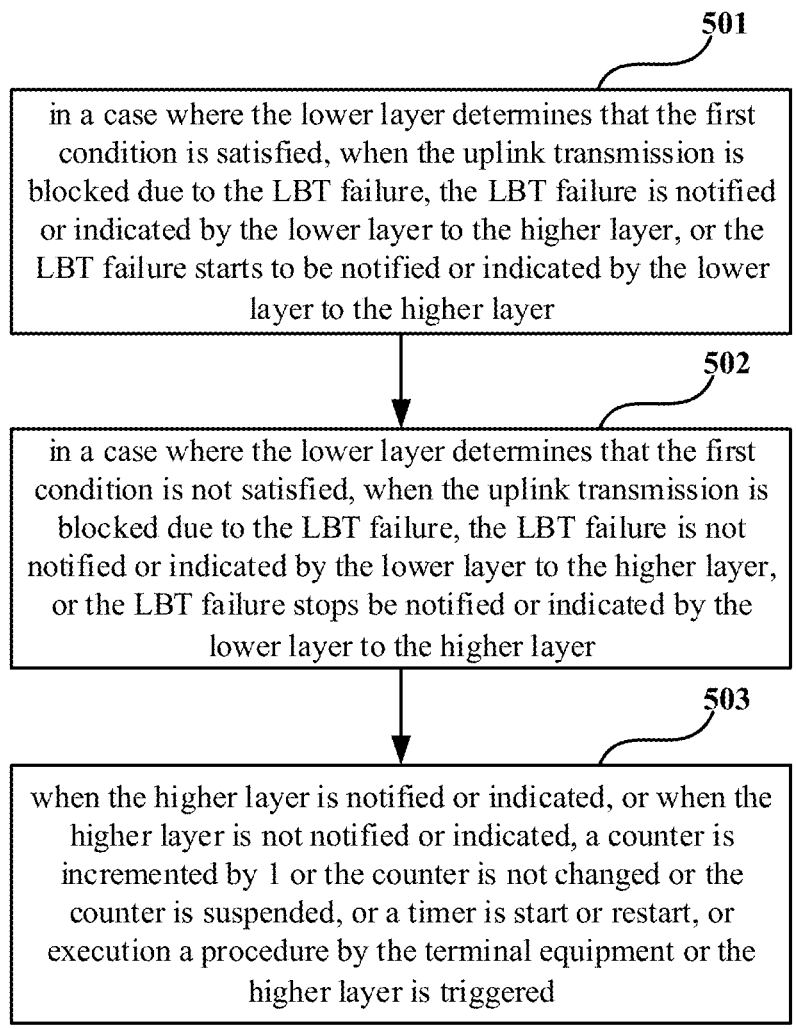
FIG. 5 is another schematic diagram of the method for indicating an LBT failure of Embodiment 1 of this disclosure.

Case 1: the lower layer determines whether the first condition is satisfied. FIG. 5 is another schematic diagram of the method for indicating an LBT failure of Embodiment 1 of this disclosure. As shown in FIG. 5, the method includes:

Step 501: in a case where the lower layer determines that the first condition is satisfied, when the uplink transmission is blocked due to the LBT failure, the LBT failure is notified or indicated by the lower layer to the higher layer, or the LBT failure starts to be notified or indicated by the lower layer to the higher layer; and/or, Step 502: in a case where the lower layer determines that the first condition is not satisfied, when the uplink transmission is blocked due to the LBT failure, the LBT failure is not notified or indicated by the lower layer to the higher layer, or the LBT failure stops be notified or indicated by the lower layer to the higher layer.

In the embodiment of this disclosure, the method may include one of or both of steps 501 and 502, and when the method includes both of steps 501 and 502, an order of execution of steps 501 and 502 is not limited.

In at least one embodiment of this disclosure, for example, the first condition includes at least one of the following that: the terminal equipment is an NR-U terminal; the terminal equipment is an NR terminal; the terminal equipment is an NR-U terminal or an NR terminal; the uplink transmission or the terminal equipment performs a shared spectrum channel access operation; the uplink transmission is an uplink transmission scheduled or configured by a network device; the uplink transmission is not license assisted access (LAA) or enhanced license assisted access (eLAA); the terminal equipment is not performing license assisted access or enhanced license assisted access; and the uplink transmission is not automatic uplink transmission.

That is, when at least one of that the terminal equipment is an NR-U terminal, the terminal equipment is an NR terminal, the terminal equipment is an NR-U terminal or an NR terminal, the uplink transmission or the terminal equipment performs a shared spectrum channel access operation, the uplink transmission is uplink transmission scheduled or configured by the network device, the uplink transmission is not license assisted access (LAA) or enhanced license assisted access (eLAA), the terminal equipment is not performing license assisted access (LAA) or enhanced license assisted access and the uplink transmission is not automatic uplink transmission holds, the lower layer notifies or indicates the LBT failure to the higher layer, or the lower layer starts to notify or indicate the LBT failure to the higher layer. In addition, when all the conditions listed above do not hold, the lower layer does not notify or indicate the LBT failure to the higher layer, or the lower layer stops notifying or indicating the LBT failure to the higher layer.

Alternatively, it may also be said that for at least one of an NR-U terminal, an NR terminal, an NR-U terminal or NR terminal, a shared spectrum channel access operation, uplink transmission scheduled or configured by the network device, non-LAA or eLAA and non-AUL, the lower layer notifies or indicates the LBT failure to the higher layer, or the lower layer starts to notify or indicate the LBT failure to the higher layer.

According to the method described in case 1, not only interaction between the lower layer and the higher layer may be reduced, power consumption of the terminal equipment may be lowered, the method is relatively simple, and an effect on standards is relatively small, but also cost of the terminal equipment may be lowered, and cost of tests may also be lowered.

In at least one embodiment of this disclosure, in step 501, the LBT failure is notified or indicated includes: a notification or an indication is transmitted, or, a notification or an indication and an object executing the LBT is transmitted.

That is to say, the above notification or indication may be performed via a notification or indication transmitted by the lower layer to the higher layer, or may be performed via a notification or indication transmitted by the lower layer to the higher layer and an object performing the LBT.

For example, the transmitted notification or indication may be one of the following notifications or indications:
  generic indication or notification;
  a notification or indication for specific a purpose, such as an indication of consistent UL LBT failure detection, or an indication of a random access preamble, or an indication of a configured grant, or an indication of a scheduling request (SR);
  a notification or indication transmitted by the lower layer to the higher layer via different service access points (SAPs) or channels or paths; and
  a notification or indication provided to different higher layer procedures or functions or entities, for example, the higher layer procedures or functions or entities refer to at least one of the following: consistent LBT failure detection, a random access procedure, random access preamble transmission, a hybrid automatic repeat request (HARQ), transmission of an uplink configured grant, and a scheduling request (SR).

In at least one embodiment of this disclosure, in the case where the notification or indication is performed via a notification or indication transmitted by the lower layer to the higher layer and an object performing the LBT, the object performing the LBT may be characterized by an uplink resource or an index corresponding to an uplink resource.

For example, the uplink resource includes at least one of a random access resource (RA/PRACH occasion), a valid PUCCH resource of a scheduling request (SR), or a configured grant.

For the case where the object performing the LBT is characterized by an index corresponding to the uplink resource, for example, a mapping relationship is defined, and the object may be characterized by a corresponding index, for example, it is defined that the random access resource (RA/PRACH occasion) corresponds to index 1, a valid PUCCH resource of the SR corresponds to index 2, and the configured grant corresponds to index 3.

In at least one embodiment of this disclosure, when the lower layer determines that the first condition is satisfied and the lower layer determines that a fourth condition is satisfied, the lower layer notifies or indicates the LBT failure to the higher layer. In this way, by further restricting the conditions, the interaction between the lower layer and the higher layer may further be reduced, thereby further reducing the power consumption of the terminal equipment.

Figure 6:
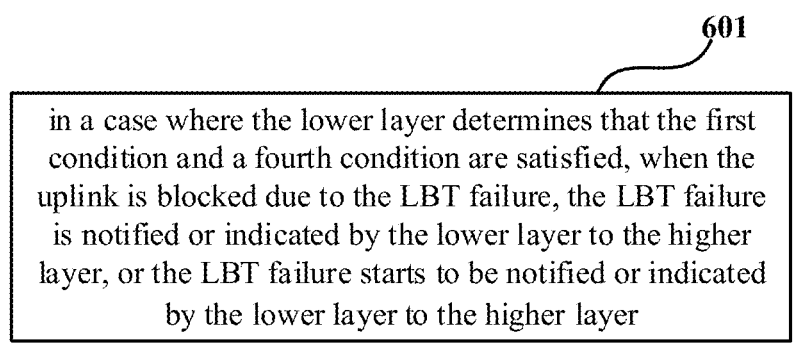
FIG. 6 is a further schematic diagram of the method for indicating an LBT failure of Embodiment 1 of this disclosure.

FIG. 6 is another schematic diagram of the method for indicating an LBT failure of Embodiment 1 of this disclosure. As shown in FIG. 6, the method includes:
  Step 601: in a case where the lower layer determines that the first condition and a fourth condition are satisfied, when the uplink is blocked due to the LBT failure, the LBT failure is notified or indicated by the lower layer to the higher layer, or the LBT failure starts to be notified or indicated by the lower layer to the higher layer.

In at least one embodiment of this disclosure, the fourth condition includes at least one of the following conditions that: the LBT failure is a failure of any LBT; the LBT failure is a failure of LBT performed for a random access preamble transmission; the LBT failure is a failure of LBT performed for a configured grant; or the LBT failure is a failure of LBT performed for a valid physical uplink control channel (PUCCH) resource of a scheduling request (SR).

In at least one embodiment of this disclosure, for the case where the LBT failure is a failure of any LBT, that is, for an uplink transmission, the terminal equipment or the lower layer fails to access to a channel, if the lower layer determines that the first condition is satisfied at the same time, the lower layer notifies or indicates the LBT failure to the higher layer.

For example, the uplink transmission is indicated by the higher layer (e.g. an MAC layer), or is triggered or generated by the lower layer (e.g. a physical layer) itself, such as acknowledgment or non-acknowledgement (ACK or NACK), a sounding reference signal (SRS), a channel quality indication (CQI), etc.;
  for example, there is no restriction on a channel used for uplink transmission; for example, the uplink transmission may be performed on a physical uplink control channel (PUCCH), a physical uplink shared channel (PUSCH) or a physical random access channel (PRACH);
  for example, an LBT type of the executed LBT is not limited; for example, the LBT type of the executed LBT may be LBT type 2 or LBT type 4, etc.;
  for example, a channel access priority class (CAPC) of the executed LBT is not limited, for example, the CAPC is 1 or 4, etc.

In at least one embodiment of this disclosure, for the case where the LBT failure is a failure of LBT performed for a random access preamble transmission (RA preamble), that is, in order to transmit the RA preamble, the terminal equipment or the lower layer fails to access to a channel, when the lower layer determines that the first condition is satisfied at the same time, the lower layer notifies or indicates the LBT failure to the higher layer.

For example, a channel to which the LBT corresponds is a physical random access channel (PRACH), and the LBT is LBT performed on the random access resource (RA/PRACH occasion) instructed by the higher layer;
  for example, the uplink transmission is indicated by the higher layer (e.g. an MAC layer), or is triggered or generated by the lower layer (e.g. a physical layer) itself, such as repetition of the physical layer;
  for example, the LBT type of the executed LBT is not limited; for example, the LBT type of the executed LBT may be LBT type 2 or LBT type 4, etc.;
  for example, a channel access priority class (CAPC) of the executed LBT is not limited, for example, the CAPC is 1 or 4, etc.

In at least one embodiment of this disclosure, for the case where the LBT failure is a failure of LBT performed for a configured grant, that is, in order to transmit uplink transmission on the configured grant, the terminal equipment or lower layer fails to access to a channel, if the lower layer determines that the first condition is satisfied at the same time, the lower layer notifies or indicates the LBT failure to the higher layer.

For example, a channel to which the LBT corresponds is a physical uplink shared channel (PUSCH), and the LBT is LBT performed for the configured grant indicated by the higher layer;
  for example, the LBT type of the executed LBT is not limited; for example, the LBT type of the executed LBT may be LBT type 2 or LBT type 4, etc.;

for example, a channel access priority class (CAPC) of the executed LBT is not limited, for example, the CAPC is 1 or 4, etc.

In at least one embodiment of this disclosure, for the case where the LBT failure is a failure of LBT performed for a valid physical uplink control channel (PUCCH) resource of a scheduling request (SR), that is, in order to transmit the SR on the valid PUCCH resource, the terminal equipment or the lower layer fails to access to a channel, and if the lower layer determines that the first condition is satisfied at the same time, the lower layer notifies or indicates the LBT failure to the higher layer.

For example, a channel to which the LBT corresponds is a physical uplink control channel (PUCCH), and the LBT is LBT performed on the valid PUCCH resource of the SR indicated by a higher layer;

for example, the LBT type of the executed LBT is not limited; for example, the LBT type of the executed LBT may be LBT type 2 or LBT type 4, etc.;

for example, a channel access priority class (CAPC) of the executed LBT is not limited, for example, the CAPC is 1 or 4, etc.

In at least one embodiment of this disclosure, as shown in FIG. 5, the method may further include:

Step 503: when the higher layer is notified or indicated, or when the higher layer is not notified or indicated, a counter is incremented by 1 or the counter is not changed or the counter is suspended, or a timer is start or restart, or execution a procedure by the terminal equipment or the higher layer is triggered.

In at least one embodiment of this disclosure, the counter is one of the following counters:

a counter used for counting the number of scheduling requests, such as a counter SR_COUNTER;

a counter used for applying or suspending power ramping, such as a counter PREAMBLE_POWER_RAMPING_COUNTER; and a counter used for consistent LBT failure detection, such as a counter LBT_COUNTER.

In at least one embodiment of this disclosure, the timer is a timer used for a configured grant (CG), such as configuredGrantTimer or cg-Retransmission Timer, or the timer is a timer used for consistent LBT failure detection, such as lbt-FailureDetectionTimer.

In at least one embodiment of this disclosure, the procedure triggering the terminal equipment or the higher layer to perform is a random access procedure or a random access resource selection procedure.

In this way, for notifying or indicating the LBT failure by the lower layer to the higher layer in the embodiment of this disclosure, the notification or indication may not only notify or indicate the LBT failure, but also trigger other behaviors or operations or procedures according to whether the higher layer is notified or indicated, such as the operation for the counter for the scheduling request or the counter for applying or suspending power ramping, and/or triggering the random access procedure or the random access resource selection procedure, as described above.

Case 2: the lower layer determines whether the second condition and/or the third condition are/is satisfied.

Figure 7:
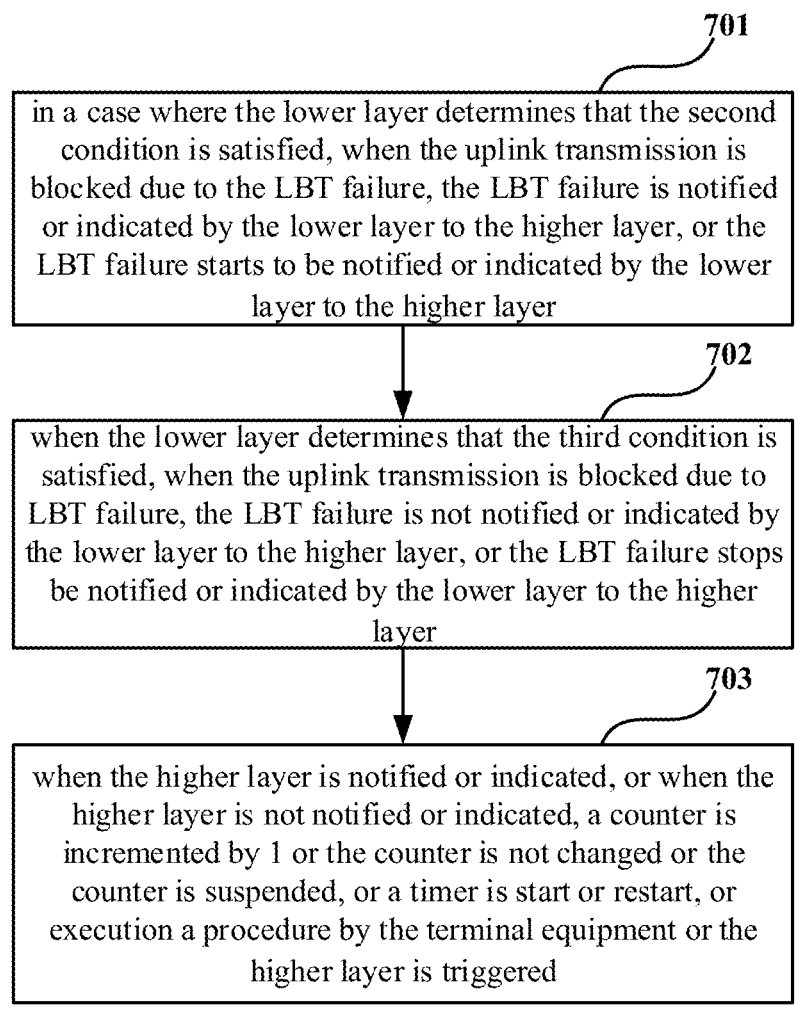
FIG. 7 is still another schematic diagram of the method for indicating an LBT failure of Embodiment 1 of this disclosure.

FIG. 7 is still another schematic diagram of the method for indicating an LBT failure of Embodiment 1 of this disclosure. As shown in FIG. 7, the method includes:

Step 701: in a case where the lower layer determines that the second condition is satisfied, when the uplink transmission is blocked due to the LBT failure, the LBT failure is notified or indicated by the lower layer to the higher layer, or the LBT failure starts to be notified or indicated by the lower layer to the higher layer; and/or, Step 702: when the lower layer determines that the third condition is satisfied, when the uplink transmission is blocked due to LBT failure, the LBT failure is not notified or indicated by the lower layer to the higher layer, or the LBT failure stops be notified or indicated by the lower layer to the higher layer.

In the embodiment of this disclosure, the method may include one of or both of steps 701 and 702, and when the method includes both of steps 701 and 702, an order of execution of steps 701 and 702 is not limited.

In at least one embodiment of this disclosure, the second condition is that a higher layer parameter is configured and/or having a capability, and/or, the third condition is that a higher layer parameter is released or removed and/or having no capability.

For example, the higher layer parameter is an RRC parameter.

Figure 8:
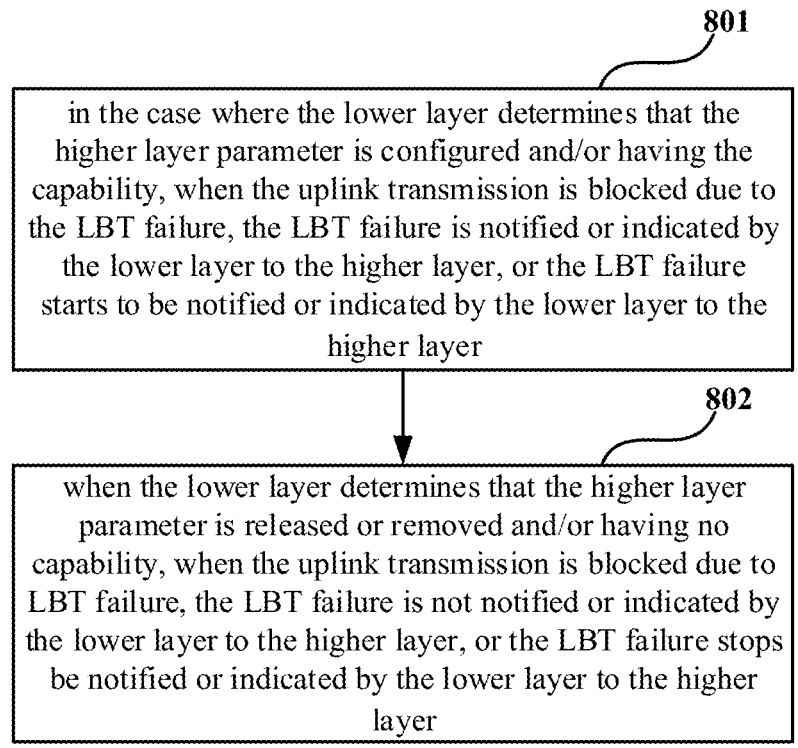
FIG. 8 is a schematic diagram of the method for indicating an LBT failure of Embodiment 1 of this disclosure.

FIG. 8 is a schematic diagram of the method for indicating an LBT failure of Embodiment 1 of this disclosure. As shown in FIG. 8, the method includes:

Step 801: in the case where the lower layer determines that the higher layer parameter is configured and/or having the capability, when the uplink transmission is blocked due to the LBT failure, the LBT failure is notified or indicated by the lower layer to the higher layer, or the LBT failure starts to be notified or indicated by the lower layer to the higher layer; and/or, Step 802: when the lower layer determines that the higher layer parameter is released or removed and/or having no capability, when the uplink transmission is blocked due to LBT failure, the LBT failure is not notified or indicated by the lower layer to the higher layer, or the LBT failure stops be notified or indicated by the lower layer to the higher layer.

In the embodiment of this disclosure, the method may include one of or both of steps 801 and 802, and when the method includes both of steps 801 and 802, an order of execution of steps 801 and 802 is not limited.

The method described in Case 2 limits more accurate conditions, which may further reduce interaction between the lower layer and the higher layer, thereby further lowering the power consumption of the terminal equipment.

In at least one embodiment of this disclosure, the higher layer parameter includes at least one of the following parameters: a parameter used for consistent LBT failure detection of shared spectrum channel access; a configuration parameter used for a scheduling request; or a configuration parameter used for a configured grant.

For the parameter used for consistent LBT failure detection of shared spectrum channel access, for example, the higher layer parameter is lbt-FailureRecoveryConfig, and for another example, the higher layer parameter is cell-specific or terminal equipment-specific; and/or, when dual-connectivity (DC) is configured, the higher layer parameter is respectively configured in a master cell group (MCG) and a secondary cell group (SCG); and/or, when a supplementary uplink (SUL) is configured, the higher layer parameter is respectively configured for the supplementary uplink (SUL) and a normal uplink (NUL).

For the configuration parameter used for a scheduling request, for example, the higher layer parameter is a parameter for configuring a dedicated scheduling request resource, such as SchedulingRequestConfig; and for another example, the higher layer parameter is a parameter for a maximum number of times of SR transmission, such as sr-TransMax.

For the configuration parameter used for a configured grant (CG), for example, the higher layer parameter is a parameter for configuring uplink transmission with no dynamic grant, such as ConfiguredGrantConfig; and for another example, the higher layer parameter is a parameter for a timer of a CG, such as configuredGrantTimer or cg-RetransmissionTimer.

In at least one embodiment of this disclosure, the capability is a capability for NR operation in a shared spectrum channel and/or a capability for consistent LBT detection and recovery.

In at least one embodiment of this disclosure, the capability is specific for a terminal equipment (terminal equipment-specific); or, the capability is specific for a cell (cell-specific), such as respective capabilities of a primary cell (PCell), a primary secondary cell (PSCell), and a secondary cell (SCell); or, the capability is specific for a frequency band (band-specific) or specific for a frequency band combination (band-combination-specific).

In at least one embodiment of this disclosure, in step 701 or step 801, notifying or indicating the LBT failure includes: transmitting a notification or indication, or, transmitting a notification or indication and an object executing LBT.

That is, the above notification or indication may be performed by transmitting a notification or indication by the lower layer to the higher layer, or may also be performed by transmitting a notification or indication and the object performing the LBT by the lower layer to the higher layer.

In Case 2, the specific method for performing the above notification or indication by transmitting a notification or indication by the lower layer to the higher layer and by transmitting a notification or indication and the object performing the LBT by the lower layer to the higher layer may be identical to that in Case 1, which shall not be described herein any further.

In at least one embodiment of this disclosure, when the lower layer determines that the second condition is satisfied and the lower layer determines that the fourth condition is satisfied, the lower layer notifies or indicates the LBT failure to the higher layer. In this way, by further restricting the conditions, the interaction between the lower layer and the higher layer may further be reduced, thereby further lowering the power consumption of the terminal equipment.

Figure 9:
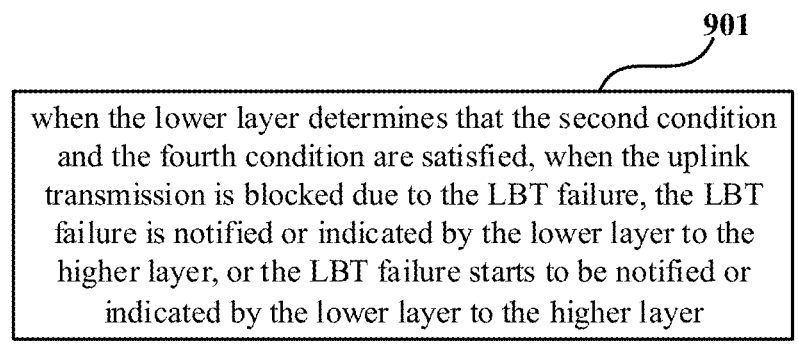
FIG. 9 is another schematic diagram of the method for indicating an LBT failure of Embodiment 1 of this disclosure.

FIG. 9 is another schematic diagram of the method for indicating an LBT failure of Embodiment 1 of this disclosure. As shown in FIG. 9, the method includes:

Step 901: when the lower layer determines that the second condition and the fourth condition are satisfied, when the uplink transmission is blocked due to the LBT failure, the LBT failure is notified or indicated by the lower layer to the higher layer, or the LBT failure starts to be notified or indicated by the lower layer to the higher layer.

In at least one embodiment of this disclosure, the fourth condition includes at least one of the following conditions that: the LBT failure is a failure of any LBT; the LBT failure is a failure of LBT performed for a random access preamble transmission; the LBT failure is a failure of LBT performed for a configured grant; and the LBT failure is a failure of LBT performed for a valid physical uplink control channel (PUCCH) resource of a scheduling request (SR).

In Case 2, specific contents of the fourth condition may be identical to those described in Case 1, which shall not be described herein any further.

In at least one embodiment of this disclosure, similar to step 503 in Case 1, as shown in FIG. 7, the method may further include:

Step 703: when the higher layer is notified or indicated, or when the higher layer is not notified or indicated, a counter is incremented by 1 or the counter is not changed or the counter is suspended, or a timer is start or restart, or execution a procedure by the terminal equipment or the higher layer is triggered.

In Case 2, specific contents of the counter, the timer and the procedure executed by triggering a terminal equipment or a higher layer may be identical to those described in Case 1, which shall not be described herein any further.

Case 3: the higher layer determines whether the first condition is satisfied.

Figure 10:
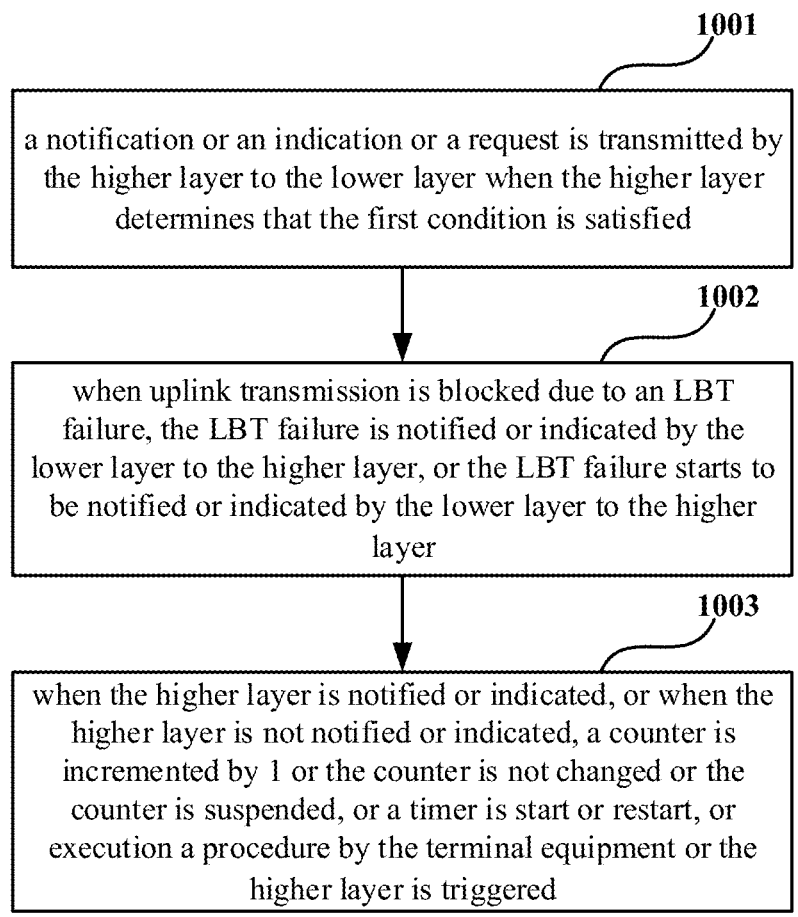
FIG. 10 is a further schematic diagram of the method for indicating an LBT failure of Embodiment 1 of this disclosure.

FIG. 10 is a further schematic diagram of the method for indicating an LBT failure of Embodiment 1 of this disclosure. As shown in FIG. 10, the method includes:

Step 1001: a notification or an indication or a request is transmitted by the higher layer to the lower layer when the higher layer determines that the first condition is satisfied; and Step 1002: when uplink transmission is blocked due to an LBT failure, the LBT failure is notified or indicated by the lower layer to the higher layer, or the LBT failure starts to be notified or indicated by the lower layer to the higher layer.

That is, in the case where the higher layer determines that the first condition is satisfied, the higher layer transmits the notification or indication or request to the lower layer, and when the uplink transmission is blocked due to the LBT failure, according to the notification, indication or request, the lower layer notifies or indicates the LBT failure to the higher layer, or starts to notify or indicate the LBT failure.

Figure 11:
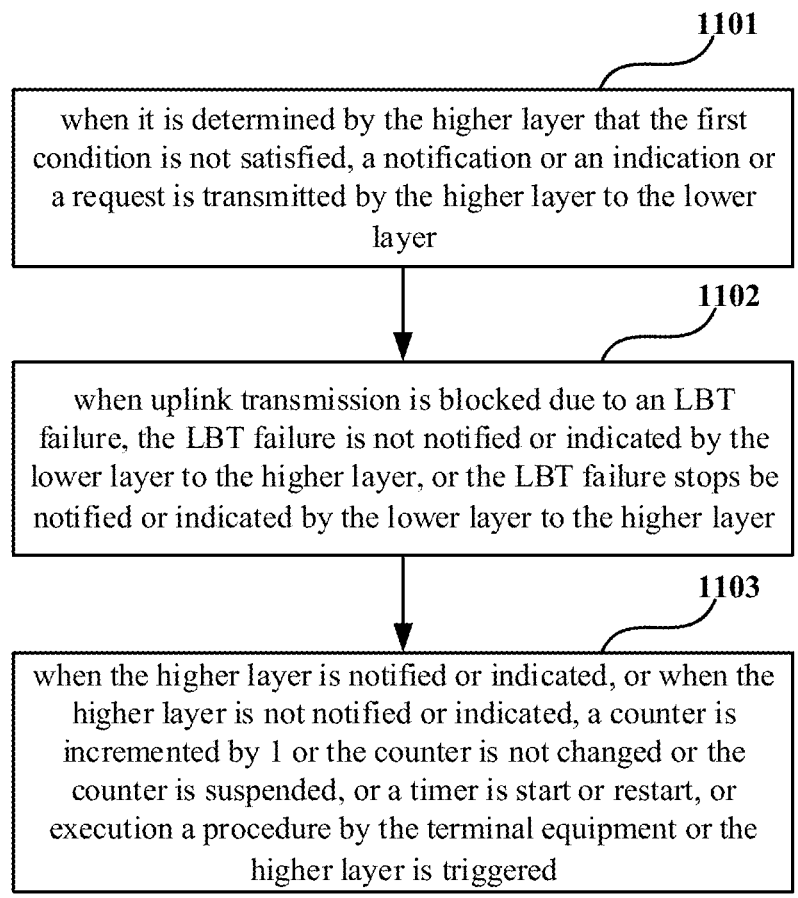
FIG. 11 is still another schematic diagram of the method for indicating an LBT failure of Embodiment 1 of this disclosure.

FIG. 11 is still another schematic diagram of the method for indicating an LBT failure of Embodiment 1 of this disclosure. As shown in FIG. 11, the method includes:

Step 1101: when it is determined by the higher layer that the first condition is not satisfied, a notification or an indication or a request is transmitted by the higher layer to the lower layer; and Step 1102: when uplink transmission is blocked due to an LBT failure, the LBT failure is not notified or indicated by the lower layer to the higher layer, or the LBT failure stops be notified or indicated by the lower layer to the higher layer.

That is, when the higher layer determines that the first condition is not satisfied, the higher layer transmits a notification, an indication or a request to the lower layer, and when the uplink transmission is blocked due to the LBT failure, according to the notification, indication or request, the lower layer does not notify or indicate the LBT failure to the higher layer, or stops notifying or indicating the LBT failure.

The method described in Case 3 limits more accurate conditions, which may further reduce interaction between the lower layer and the higher layer, thereby further lowering the power consumption of the terminal equipment.

In at least one embodiment of this disclosure, for example, specific contents of the first condition are identical to those described in Case 1.

That is, when at least one of that the terminal equipment is an NR-U terminal, the terminal equipment is an NR terminal, the terminal equipment is an NR-U terminal or an NR terminal, the uplink transmission or the terminal equipment performs a shared spectrum channel access operation, the uplink transmission is uplink transmission scheduled or configured by the network device, the uplink transmission is not license assisted access (LAA) or enhanced license assisted access (eLAA), the terminal equipment is not performing license assisted access (LAA) or enhanced license assisted access or the uplink transmission is not automatic uplink transmission holds, the higher layer transmits the notification or indication or request to the lower layer, so that the lower layer notifies or indicates the LBT failure to the higher layer, or the lower layer starts to notify or indicate the LBT failure to the higher layer. In addition, when all the conditions listed above do not hold, the higher layer transmits the notification or indication or request to the lower layer, so that the lower layer does not notify or indicate the LBT failure to the higher layer, or the lower layer stops notifying or indicating the LBT failure to the higher layer.

Alternatively, it may also be said that for at least one of an NR-U terminal, an NR terminal, an NR-U terminal or NR terminal, a shared spectrum channel access operation, uplink transmission scheduled or configured by the network device, non-LAA or eLAA, or non-AUL, the higher layer transmits the notification or indication or request to the lower layer, so that the lower layer notifies or indicates the LBT failure to the higher layer, or the lower layer starts to notify or indicate the LBT failure to the higher layer.

In at least one embodiment of this disclosure, in step 1002, the LBT failure is notified or indicated includes: a notification or indication is transmitted, or, a notification or indication and an object performing LBT is transmitted. Specific contents are identical to those described in Case 1, and shall not be described herein any further.

In at least one embodiment of this disclosure, in step 1001 and/or step 1101, the notification or indication or request includes: transmitting a notification or indication or request, or, transmitting a notification or indication or request and an object performing LBT. That is, the notification or indication or request may be performed by transmitting a notification or indication or request by the higher layer to the lower layer, or the notification or indication or request may be performed by transmitting a notification or indication or request and the object executing the LBT by the higher layer to the lower layer.

For example, the notification or indication or request transmitted by the higher layer to the lower layer is one of the following notifications or indications or requests:
a generic notification or indication;
a notification or indication for specific use, such as an indication of consistent UL LBT failure detection, or an indication of a random access preamble, or an indication of a configured grant, or an indication of a scheduling request (SR);
a notification or indication transmitted by the lower layer to the higher layer via different service access points or channels or paths; and
a notification or indication provided to different higher layer procedures or functions or entities; for example, the higher layer procedures or functions or entities are at least one of the following: consistent UL LBT failure detection, a random access procedure, random access preamble transmission, a hybrid automatic repeat request (HARQ), transmission of an uplink configured grant, or a scheduling request (SR).

In at least one embodiment of this disclosure, for the case where the notification or indication or request is performed by transmitting a notification or indication or request and the object performing the LBT by the higher layer to the lower layer, the object performing the LBT may be characterized by an uplink resource or an index corresponding to the uplink resource.

For example, the uplink resource includes at least one of a random access resource (RA/PRACH occasion), a valid PUCCH resource of a scheduling request (SR) or a configured grant.

For the case where the object performing the LBT is characterized by an index corresponding to the uplink resource, for example, a mapping relationship is defined, and the object may be characterized by the corresponding index; for example, it is defined that the random access resource (RA/PRACH occasion) corresponds to index 1, the valid PUCCH resource of the SR corresponds to index 2, and the configured grant corresponds to index 3.

In at least one embodiment of this disclosure, in step 1001, when the higher layer determines that the first condition is satisfied and the higher layer determines that the fourth condition is satisfied, the higher layer transmits a notification or indication or request to the lower layer. In this way, by further restricting the conditions, the interaction between the lower layer and the higher layer may be further reduced, thereby further lowering the power consumption of the terminal equipment.

In Case 3, specific contents of the fourth condition may be identical to those described in Case 1, and shall not be described herein any further.

In at least one embodiment of this disclosure, in step 1001, when a counter is maintained, that is, when it is determined that a counter is incremented by 1 or unchanged or suspended, or, when a timer is maintained, that is, it is determined to start or restart a timer, or when it is determined whether the terminal equipment or the higher layer is triggered to execute a procedure, the higher layer transmits the notification or indication or request to the lower layer.

In at least one embodiment of this disclosure, the counter is one of the following counters:
a counter used for counting the number of scheduling requests, such as a counter SR_COUNTER;
a counter used for applying or suspending power ramping, such as a counter PREAMBLE_POWER_RAMPING_COUNTER; and
a counter used for consistent LBT failure detection, such as a counter LBT_COUNTER.

In at least one embodiment of this disclosure, the timer is a timer for a configured grant (CG), such as configuredGrantTimer or cg-Retransmission Timer, or the timer is a timer for consistent LBT failure detection, such as lbt-FailureDetectionTimer.

In at least one embodiment of this disclosure, the procedure triggering the terminal equipment or the higher layer to perform is a random access procedure or a random access resource selection procedure.

In at least one embodiment of this disclosure, similar to step 503 in Case 1, as shown in FIG. 10, the method may further include:
Step 1003: when the higher layer is notified or indicated, or when the higher layer is not notified or indicated, a counter is incremented by 1 or the counter is not changed or the counter is suspended, or a timer is start or restart, or execution a procedure by the terminal equipment or the higher layer is triggered.

In at least one embodiment of this disclosure, similar to step 503 of Case 1, as shown in FIG. 11, the method may further include:
Step 1103: when the higher layer is notified or indicated, or when the higher layer is not notified or indicated, a counter is incremented by 1 or the counter is not changed or the counter is suspended, or a timer is start or restart, or execution a procedure by the terminal equipment or the higher layer is triggered.

In Case 3, specific contents of the counter, the timer and the procedure executed by triggering a terminal equipment or a higher layer may be identical to those described in Case 1, which shall not be described herein any further.

Case 4: the higher layer determines whether the second condition and/or the third condition is/are satisfied.

Figure 12:
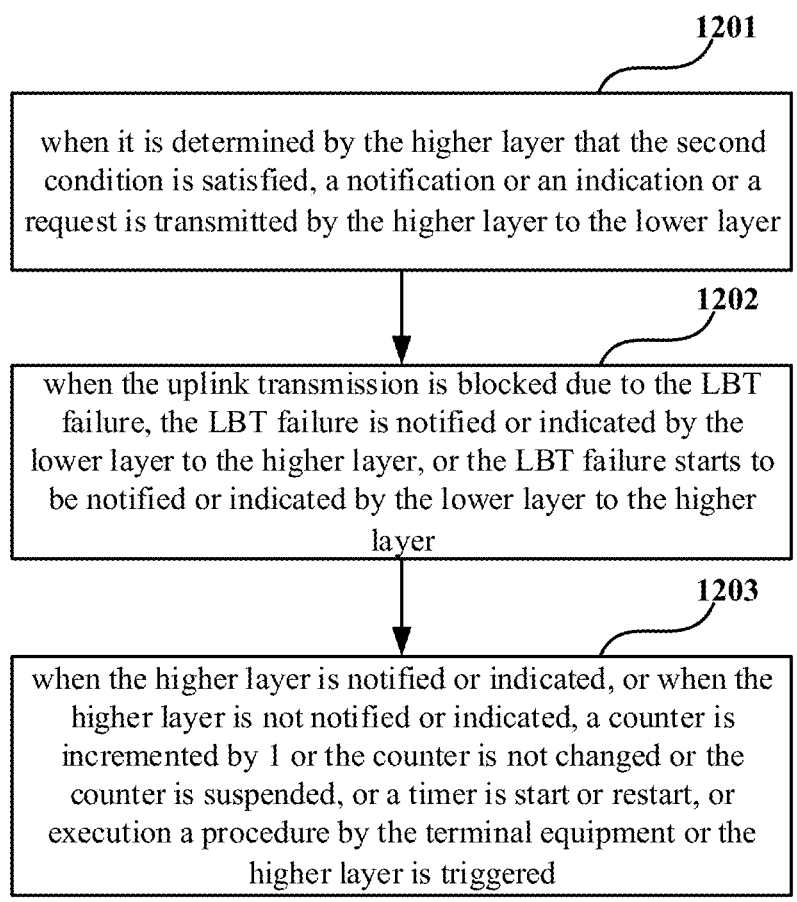
FIG. 12 is yet another schematic diagram of the method for indicating an LBT failure of Embodiment 1 of this disclosure.

FIG. 12 is yet another schematic diagram of the method for indicating an LBT failure of Embodiment 1 of this disclosure. As shown in FIG. 12, the method includes:

Step 1201: when it is determined by the higher layer that the second condition is satisfied, a notification or an indication or a request is transmitted by the higher layer to the lower layer; and Step 1202: when the uplink transmission is blocked due to the LBT failure, the LBT failure is notified or indicated by the lower layer to the higher layer, or the LBT failure starts to be notified or indicated by the lower layer to the higher layer.

That is, when the higher layer determines that the second condition is satisfied, the higher layer transmits the notification or indication or request to the lower layer, and when the uplink transmission is blocked due to the LBT failure, according to the notification, indication or request, the lower layer notifies or indicates the LBT failure to the higher layer, or starts to notify or indicate the LBT failure.

Figure 13:
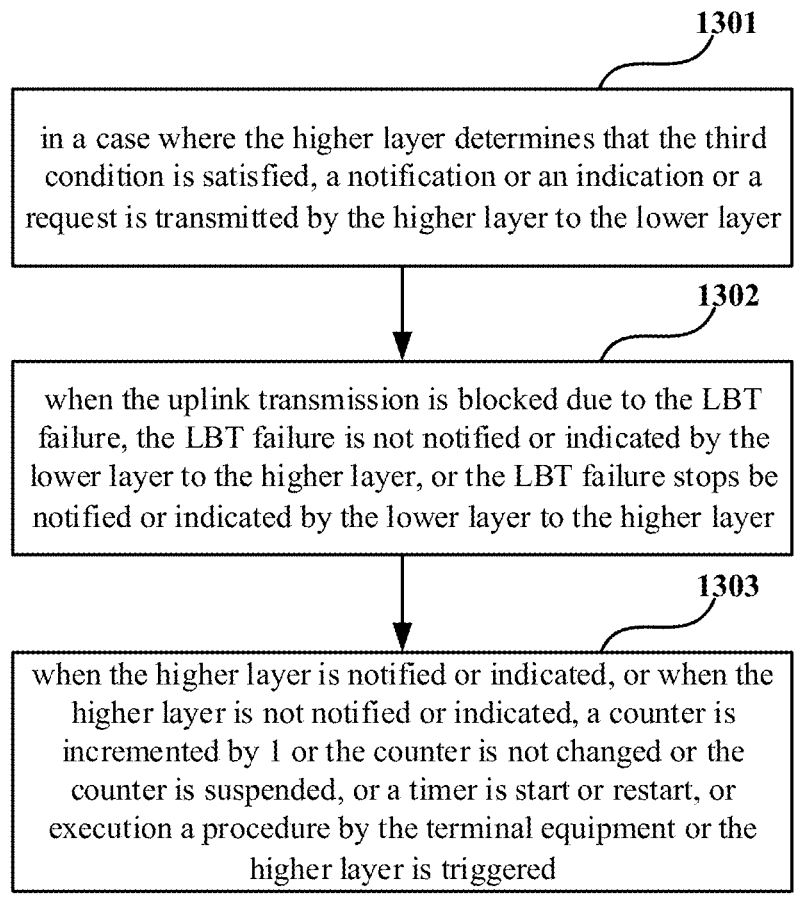
FIG. 13 is yet still another schematic diagram of the method for indicating an LBT failure of Embodiment 1 of this disclosure.

FIG. 13 is yet still another schematic diagram of the method for indicating an LBT failure of Embodiment 1 of this disclosure. As shown in FIG. 13, the method includes:

Step 1301: in a case where the higher layer determines that the third condition is satisfied, a notification or an indication or a request is transmitted by the higher layer to the lower layer; and Step 1302: when the uplink transmission is blocked due to the LBT failure, the LBT failure is not notified or indicated by the lower layer to the higher layer, or the LBT failure stops be notified or indicated by the lower layer to the higher layer.

That is, when the higher layer determines that the third condition is satisfied, the higher layer transmits a notification or indication or request to the lower layer, and according to the notification, indication or request, when the uplink transmission is blocked due to the LBT failure, the lower layer does not notify or indicate the LBT failure to the higher layer, or stops notifying or indicating the LBT failure.

The method described in Case 4 limits more accurate conditions, which may further reduce the interaction between the lower layer and the higher layer, thereby further lowering the power consumption of the terminal equipment.

In at least one embodiment of this disclosure, the second condition is that a higher layer parameter is configured and/or having a capability, and/or, the third condition is that a higher layer parameter is released or removed and/or having no capability.

In Case 4, specific contents of the higher layer parameter and capability may be identical to those described in Case 2, which shall not be described herein any further.

In at least one embodiment of this disclosure, in step 1201 and/or step 1301, the notification or indication or request includes: transmitting a notification or indication or request, or, transmitting a notification or indication or request and an object performing LBT. That is, the notification or indication or request may be performed by transmitting a notification or indication or request by the higher layer to the lower layer, or the notification or indication or request may be performed by transmitting a notification or indication or request and the object executing the LBT by the higher layer to the lower layer.

For example, the notification or indication or request transmitted by the higher layer to the lower layer is one of the following notifications or indications or requests:

a generic notification or indication;

a notification or indication for specific use, such as an indication of consistent UL LBT failure detection, or an indication of a random access preamble, or an indication of a configured grant, or an indication of a scheduling request (SR);

a notification or indication transmitted by the lower layer to the higher layer via different service access points or channels or paths; and a notification or indication provided to different higher layer procedures or functions or entities; for example, the higher layer procedures or functions or entities are at least one of the following: consistent UL LBT failure detection, a random access procedure, random access preamble transmission, a hybrid automatic repeat request (HARQ), transmission of an uplink configured grant, and a scheduling request (SR).

In at least one embodiment of this disclosure, for the case where the notification or indication or request is performed by transmitting a notification or indication or request and the object performing the LBT by the higher layer to the lower layer, the object performing the LBT may be characterized by an uplink resource or an index corresponding to the uplink resource.

For example, the uplink resource includes at least one of a random access resource (RA/PRACH occasion), a valid PUCCH resource of a scheduling request (SR) or a configured grant.

For the case where the object performing the LBT is characterized by an index corresponding to the uplink resource, for example, a mapping relationship is defined, and the object may be characterized by the corresponding index; for example, it is defined that the random access resource (RA/PRACH occasion) corresponds to index 1, the valid PUCCH resource of the SR corresponds to index 2, and the configured grant corresponds to index 3.

In at least one embodiment of this disclosure, in step 1201, when the higher layer determines that the second condition is satisfied and the higher layer determines that the fourth condition is satisfied, the higher layer transmits a notification or indication or request to the lower layer. In this way, by further restricting the conditions, the interaction between the lower layer and the higher layer may be further reduced, thereby further lowering the power consumption of the terminal equipment.

In Case 4, specific contents of the fourth condition may be identical to those described in Case 1, and shall not be described herein any further.

In at least one embodiment of this disclosure, in step 1201, when a counter is maintained, that is, when it is determined that a counter is incremented by 1 or unchanged or suspended, or, when a timer is maintained, that is, it is determined to start or restart a timer, or when it is determined whether the terminal equipment or the higher layer is triggered to execute a procedure, the higher layer transmits the notification or indication or request to the lower layer.

In at least one embodiment of this disclosure, the counter is one of the following counters:

a counter used for counting the number of scheduling requests, such as a counter SR_COUNTER;

a counter used for applying or suspending power ramping, such as a counter PREAMBLE_POWER_RAMPING_COUNTER; and a counter used for consistent LBT failure detection, such as a counter LBT_COUNTER.

In at least one embodiment of this disclosure, the timer is a timer for a configured grant (CG), such as configuredGrantTimer or cg-Retransmission Timer, or the timer is a timer for consistent LBT failure detection, such as lbt-FailureDetectionTimer.

In at least one embodiment of this disclosure, the procedure triggering the terminal equipment or the higher layer to perform is a random access procedure or a random access resource selection procedure.

In at least one embodiment of this disclosure, similar to step 503 in Case 1, as shown in FIG. 12, the method may further include:

Step 1203: when the higher layer is notified or indicated, or when the higher layer is not notified or indicated, a counter is incremented by 1 or the counter is not changed or the counter is suspended, or a timer is start or restart, or execution a procedure by the terminal equipment or the higher layer is triggered.

In at least one embodiment of this disclosure, similar to step 503 of Case 1, as shown in FIG. 13, the method may further include:

Step 1303: when the higher layer is notified or indicated, or when the higher layer is not notified or indicated, a counter is incremented by 1 or the counter is not changed or the counter is suspended, or a timer is start or restart, or execution a procedure by the terminal equipment or the higher layer is triggered.

In Case 4, specific contents of the counter, the timer and the procedure executed by triggering a terminal equipment or a higher layer may be identical to those described in Case 1, which shall not be described herein any further.

The above description is given for whether the lower layer or the higher layer determines whether the specific conditions are satisfied by taking cases 1-4 as examples. However, the embodiment of this disclosure may further include various combinations according to the following three factors: whether a main body of execution is a higher layer or a lower layer, whether the satisfied condition is the first condition or the second condition or both, and whether the first condition is not satisfied or the third condition is satisfied or the first condition is not satisfied and the third condition is satisfied.

It can be seen from the above embodiment that the lower layer or the higher layer first determines whether relevant conditions are satisfied, and based on a result of determination, when the uplink transmission is blocked due to the LBT failure, determines whether the lower layer notifies or indicates the LBT failure to the higher layer, or determines whether the lower layer starts to notify or indicate the LBT failure or stops notifying or indicating the LBT failure to the higher layer, thereby lowering power consumption of the terminal equipment.

Embodiment 2

The embodiment of this disclosure provides a method for indicating an LBT failure, which is applicable to a network device and corresponds to the method for indicating an LBT failure applicable to a terminal equipment described in Embodiment 1, with identical contents being not going to be described herein any further.

Figure 14:
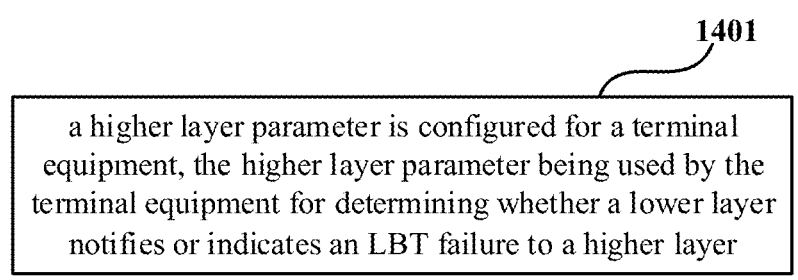
FIG. 14 is a schematic diagram of the method for indicating an LBT failure of Embodiment 2 of this disclosure.

FIG. 14 is a schematic diagram of the method for indicating an LBT failure of Embodiment 2 of this disclosure. As shown in FIG. 14, the method includes:

Step 1401: a higher layer parameter is configured for a terminal equipment, the higher layer parameter being used by the terminal equipment for determining whether a lower layer notifies or indicates an LBT failure to a higher layer.

In at least one embodiment of this disclosure, the higher layer parameter is further used by the terminal equipment to determine whether the higher layer transmits a notification, an indication or a request to the lower layer.

In at least one embodiment of this disclosure, according to the second condition and/or the third condition, the terminal equipment determines whether the lower layer notifies or indicates the LBT failure to the higher layer, or whether the lower layer starts or stops notifying or indicating the LBT failure to the higher layer, the second condition being that the higher layer parameter is configured and/or having a capability, and/or the third condition being that the higher layer parameter is released or removed and/or having no capability.

Reference may be made to the description in Embodiment 1 for specific contents of how the terminal equipment uses the higher layer parameter, which shall not be described herein any further.

In at least one embodiment of this disclosure, the higher layer parameter includes at least one of the following parameters: a parameter used for consistent LBT failure detection of shared spectrum channel access; a configuration parameter used for a scheduling request; or a configuration parameter used for a configured grant.

In at least one embodiment of this disclosure, the higher layer parameter is cell-specific or terminal equipment-specific; and/or, when dual-connectivity (DC) is configured, the higher layer parameter is respectively configured in a master cell group (MCG) and a secondary cell group (SCG); and/or, when a supplementary uplink (SUL) is configured, the higher layer parameter is respectively configured for the supplementary uplink (SUL) and a normal uplink (NUL).

In this embodiment, reference may be made to the description in Embodiment 1 for specific contents of the higher layer parameter, which shall not be described herein any further.

It can be seen from the above embodiment that the network device configures the terminal equipment with the higher layer parameter for use by the terminal equipment to determine whether the lower layer notifies or indicates the LBT failure to the higher layer. Hence, the lower layer or the higher layer first determines whether related conditions are satisfied, and then based on a result of determination, when the transmission is blocked due to the LBT failure, determines whether the lower layer notifies or indicates the LBT failure to the higher layer, or determines whether the lower layer starts or stops notifying or indicating the LBT failure to the higher layer, which may reduce the interaction between the lower layer and the higher layer, thereby lowering the power consumption of the terminal equipment.

Embodiment 3

The embodiment of this disclosure provides a method for indicating an LBT failure, which is applicable to a network device and a terminal equipment and corresponds to the method for indicating an LBT failure applicable to a terminal equipment described in Embodiment 1 and the method for indicating an LBT failure applicable to a network device described in Embodiment 2, with identical contents being not going to be described herein any further.

Figure 15:
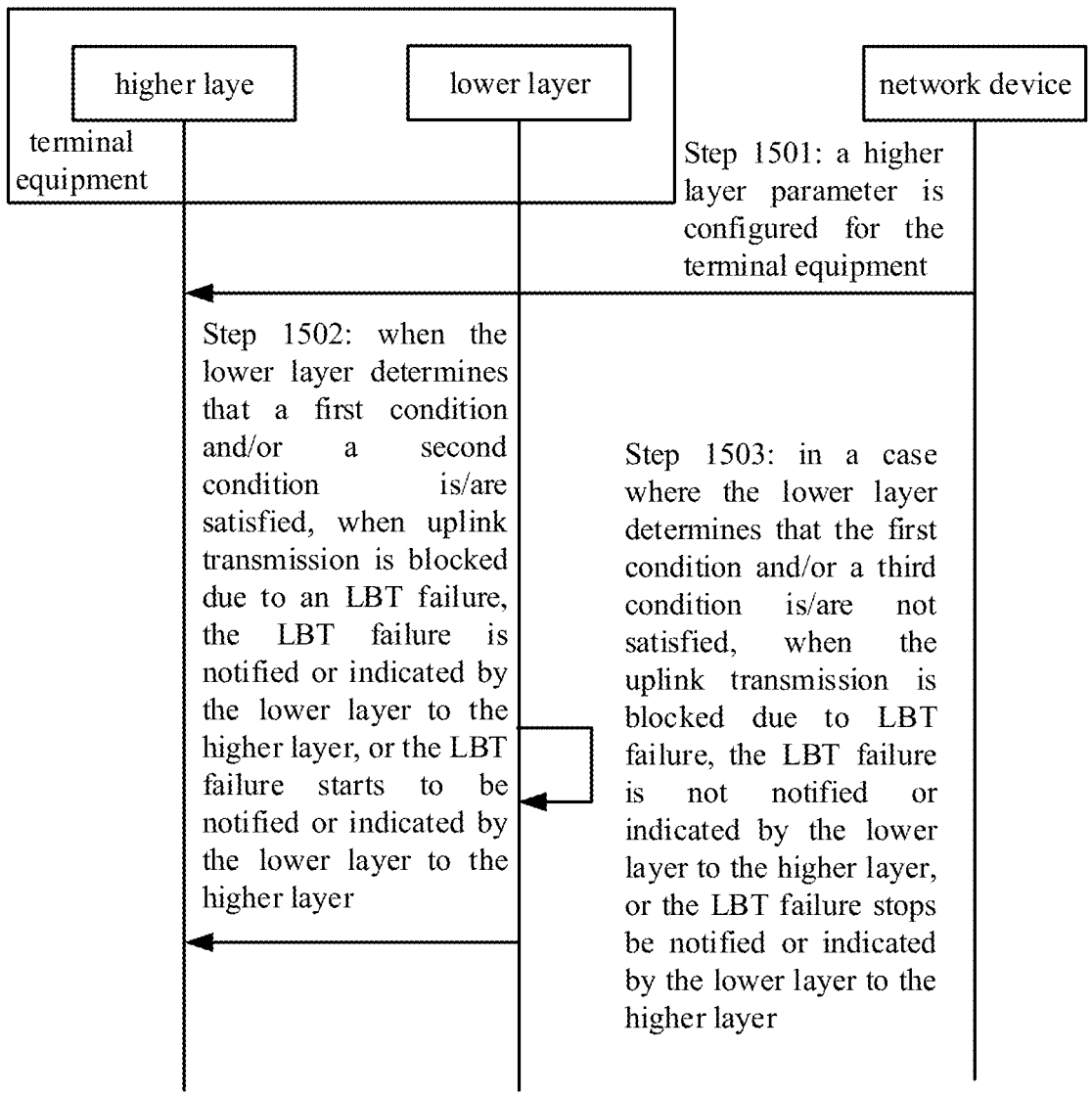
FIG. 15 is a schematic diagram of the method for indicating an LBT failure of Embodiment 3 of this disclosure.

FIG. 15 is a schematic diagram of the method for indicating an LBT failure of Embodiment 3 of this disclosure. As shown in FIG. 15, the method includes:

Step 1501: a higher layer parameter is configured by the network device for the terminal equipment, the higher layer parameter being used by the terminal equipment to determine whether a lower layer notifies or indicates an LBT failure to the higher layer;

Step 1502: when the lower layer determines that a first condition and/or a second condition is/are satisfied, when uplink transmission is blocked due to an LBT failure, the LBT failure is notified or indicated by the lower layer to the higher layer, or the LBT failure starts to be notified or indicated by the lower layer to the higher layer; and Step 1503: in a case where the lower layer determines that the first condition and/or a third condition is/are not satisfied, when the uplink transmission is blocked due to LBT failure, the LBT failure is not notified or indicated by the lower layer to the higher layer, or the LBT failure stops be notified or indicated by the lower layer to the higher layer.

Figure 16:
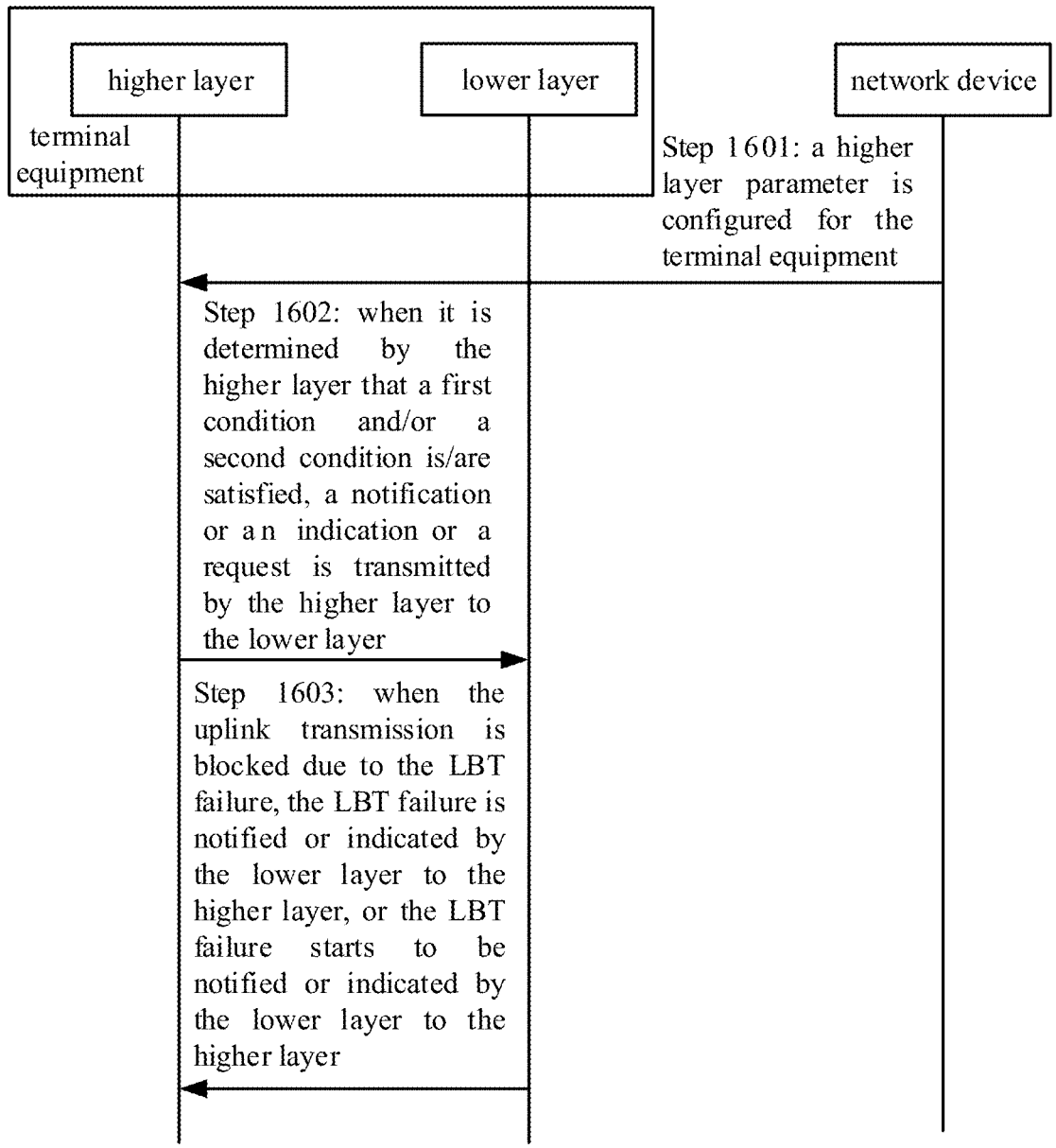
FIG. 16 is another schematic diagram of the method for indicating an LBT failure of Embodiment 3 of this disclosure.

FIG. 16 is another schematic diagram of the method for indicating an LBT failure of Embodiment 3 of this disclosure. As shown in FIG. 16, the method includes:

Step 1601: a higher layer parameter is configured by the network device for the terminal equipment, the higher layer parameter being used by the terminal equipment to determine whether a lower layer notifies or indicates an LBT failure to the higher layer;

Step 1602: when it is determined by the higher layer that a first condition and/or a second condition is/are satisfied, a notification or an indication or a request is transmitted by the higher layer to the lower layer; and Step 1603: when the uplink transmission is blocked due to the LBT failure, the LBT failure is notified or indicated by the lower layer to the higher layer, or the LBT failure starts to be notified or indicated by the lower layer to the higher layer.

Figure 17:
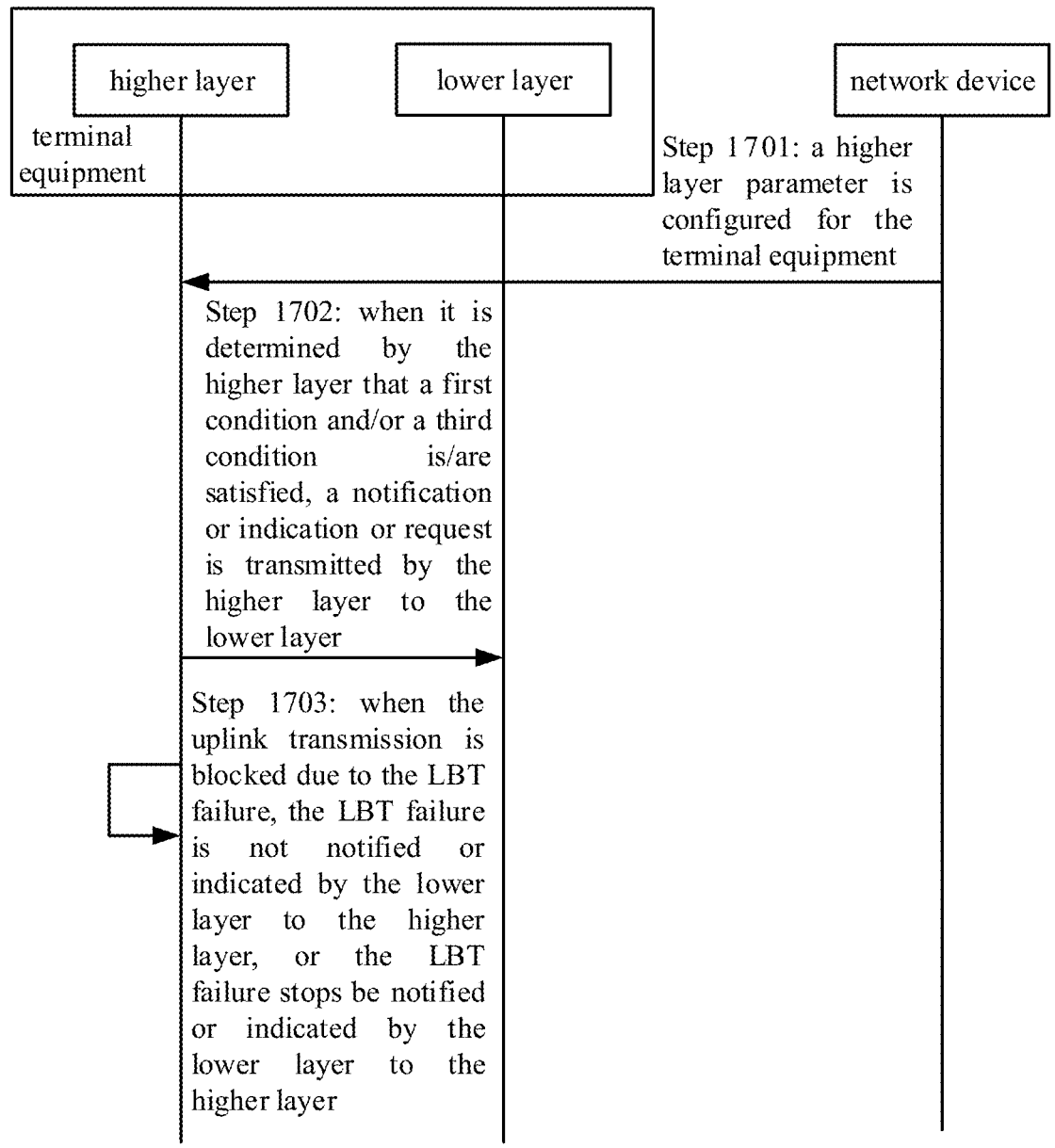
FIG. 17 is a further schematic diagram of the method for indicating an LBT failure of Embodiment 1 of this disclosure.

FIG. 17 is a further schematic diagram of the method for indicating an LBT failure of Embodiment 1 of this disclosure. As shown in FIG. 17, the method includes:

Step 1701: a higher layer parameter by the network device for the terminal equipment, the higher layer parameter being used by the terminal equipment to determine whether a lower layer notifies or indicates an LBT failure to the high layer;

Step 1702: when it is determined by the higher layer that a first condition and/or a third condition is/are satisfied, a notification or indication or request is transmitted by the higher layer to the lower layer; and Step 1703: when the uplink transmission is blocked due to the LBT failure, the LBT failure is not notified or indicated by the lower layer to the higher layer, or the LBT failure stops be notified or indicated by the lower layer to the higher layer.

In at least one embodiment of this disclosure, reference may be made to the description in Embodiment 1 and Embodiment 2 for particular implementations of the steps in FIGS. 15-17, which shall not be described herein any further.

It can be seen from the above embodiment that the lower layer or the higher layer first determines whether relevant conditions are satisfied, and based on a result of determination, when the uplink transmission is blocked due to the LBT failure, determines whether the lower layer notifies or indicates the LBT failure to the higher layer, or determines whether the lower layer starts to notify or indicate the LBT failure or stops notifying or indicating the LBT failure to the higher layer, which may reduce the interaction between the lower layer and the higher layer, thereby lowering power consumption of the terminal equipment.

Embodiment 4

The embodiment of this disclosure provides an apparatus for indicating an LBT failure, applicable to a terminal equipment. As a principle of the apparatus for solving problems is similar to that of the method of Embodiment 1, reference may be made to the method of Embodiment 1 for particular implementations of the apparatus, with identical contents being not going to be described herein any further.

Figure 18:
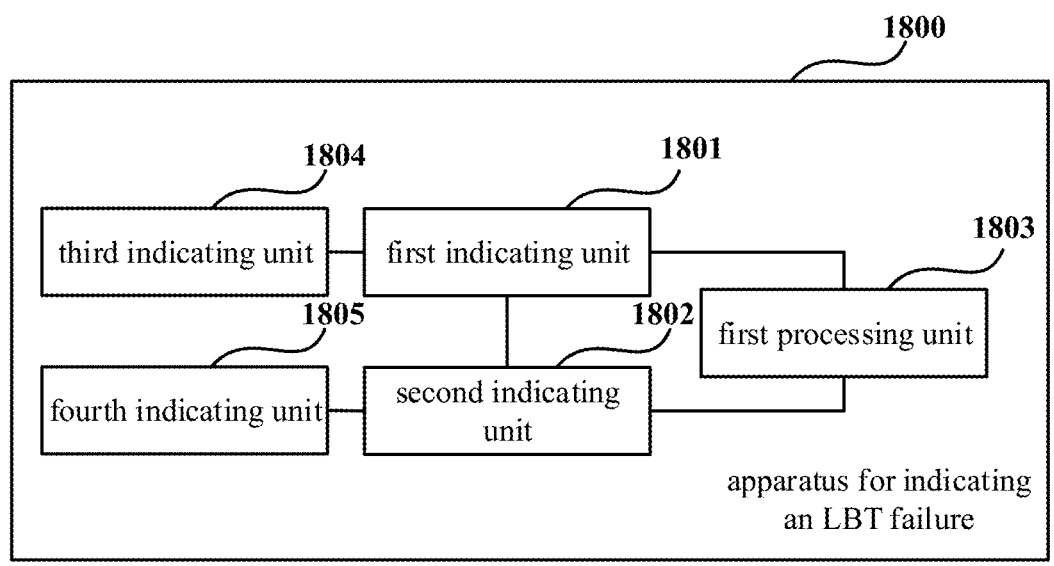
FIG. 18 is a schematic diagram of the apparatus for indicating an LBT failure of Embodiment 4 of this disclosure.

FIG. 18 is a schematic diagram of the apparatus for indicating an LBT failure of Embodiment 4 of this disclosure. As shown in FIG. 18, an apparatus 1800 includes:

a first indicating unit 1801 configured to, in a case where a lower layer or a higher layer determines that a first condition and/or a second condition are/is satisfied, when uplink transmission is blocked due to an LBT failure, notify or indicate the LBT failure by the lower layer to the higher layer, or start to notify or indicate the LBT failure by the lower layer to the higher layer; and/or a second indicating unit 1802 configured to, in a case where the lower layer or the higher layer determines that the first condition and/or a third condition are/is not satisfied, when uplink transmission is blocked due to an LBT failure, not notify or indicate the LBT failure by the lower layer to the higher layer, or stop notifying or indicating the LBT failure by the lower layer to the higher layer.

In at least one embodiment of this disclosure, as shown in FIG. 18, the apparatus 1800 may further include:

a first processing unit 1803 configure to, when the higher layer is notified or indicated, or when the higher layer is not notified or indicated, increment a counter by 1 or not change the counter or suspend the counter, or start or restart a timer, or trigger the terminal equipment or the higher layer to execute a procedure.

In at least one embodiment of this disclosure, when the higher layer determines that the first condition and/or the second condition are/is satisfied, the apparatus 1800 may further include:

a third indicating unit 1804 configured to transmit a notification or an indication or a request by the higher layer to the lower layer, and based on the notification or the indication or the request, when uplink transmission is blocked due to an LBT failure, notify or indicate the LBT failure by the lower layer to the higher layer, or start to notify or indicate the LBT failure by the lower layer to the higher layer.

In at least one embodiment of this disclosure, when the higher layer determines that the first condition and/or the third condition are/is not satisfied, the apparatus 1800 may further include:

a fourth indicating unit 1805 configured to transmit a notification or an indication or a request by the higher layer to the lower layer, and based on the notification or the indication or the request, when uplink transmission is blocked due to an LBT failure, not notify or indicate the LBT failure by the lower layer to the higher layer, or stop notifying or indicating the LBT failure by the lower layer to the higher layer.

In this embodiment, reference may be made to the contents of relevant steps in Embodiment 1 for implementations of the functions of the above units, which shall not be described herein any further.

It can be seen from the above embodiment that the lower layer or the higher layer first determines whether relevant conditions are satisfied, and based on a result of determination, when the uplink transmission is blocked due to the LBT failure, determines whether the lower layer notifies or indicates the LBT failure to the higher layer, or determines whether the lower layer starts to notify or indicate the LBT failure or stops notifying or indicating the LBT failure to the higher layer, thereby lowering power consumption of the terminal equipment.

Embodiment 5

The embodiment of this disclosure provides an apparatus for indicating an LBT failure, applicable to a network device. As a principle of the apparatus for solving problems is similar to that of the method of Embodiment 2, reference may be made to the method of Embodiment 2 for particular implementations of the apparatus, with identical contents being not going to be described herein any further.

Figure 19:
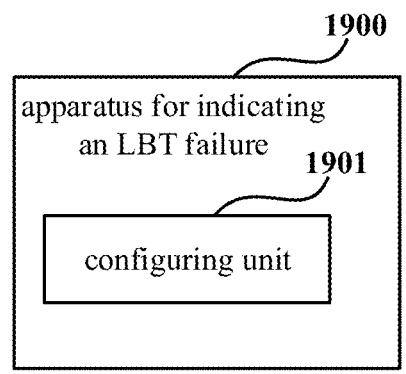
FIG. 19 is a schematic diagram of the apparatus for indicating an LBT failure of Embodiment 5 of this disclosure.

FIG. 19 is a schematic diagram of the apparatus for indicating an LBT failure of Embodiment 5 of this disclosure. As shown in FIG. 19, an apparatus 1900 includes:
a configuring unit 1901 configured to configure a higher layer parameter for a terminal equipment,
the higher layer parameter being used by the terminal equipment for determining whether a lower layer notifies or indicates an LBT failure to a higher layer.

In at least one embodiment of this disclosure, the higher layer parameter is further used by the terminal equipment for determining whether the higher layer transmits a notification or indication or request to the lower layer.

In at least one embodiment of this disclosure, according to a second condition and/or a third condition, the terminal equipment determines whether the lower layer notifies or indicates the LBT failure to the higher layer, or whether the lower layer starts to notify or indicate the LBT failure to the higher layer or stops notifying or indicating the LBT failure to the higher layer, the second condition being that the higher layer parameter is configured and/or having a capability, and/or the third condition being that the higher layer parameter is released or removed and/or having no capability.

In at least one embodiment of this disclosure, the higher layer parameter includes at least one of the following parameters: a parameter used for consistent LBT failure detection of shared spectrum channel access; a configuration parameter used for a scheduling request; or a configuration parameter used for a configured grant.

In at least one embodiment of this disclosure, the higher layer parameter is specific for a cell, or specific for a terminal equipment; and/or, when dual-connectivity (DC) is configured, the higher layer parameter is configured respectively in a master cell group (MCG) and a secondary cell group (SCG); and/or when a supplementary uplink (SUL) is configured, the higher layer parameter is configured respectively in the supplementary uplink (SUL) and a normal uplink (NUL).

In this embodiment, reference may be made to the description in Embodiment 1 for specific contents of the higher layer parameter, which shall not be described herein any further.

It can be seen from the above embodiment that the network device configures the terminal equipment with the higher layer parameter for use by the terminal equipment to determine whether the lower layer notifies or indicates the LBT failure to the higher layer. Hence, the lower layer or the higher layer first determines whether related conditions are satisfied, and then based on a result of determination, when the transmission is blocked due to the LBT failure, determines whether the lower layer notifies or indicates the LBT failure to the higher layer, or determines whether the lower layer starts or stops notifying or indicating the LBT failure to the higher layer, which may reduce the interaction between the lower layer and the higher layer, thereby lowering the power consumption of the terminal equipment.

Embodiment 6

The embodiment of this disclosure provides a terminal equipment, including the apparatus for indicating an LBT failure as described in Embodiment 4.

Figure 20:
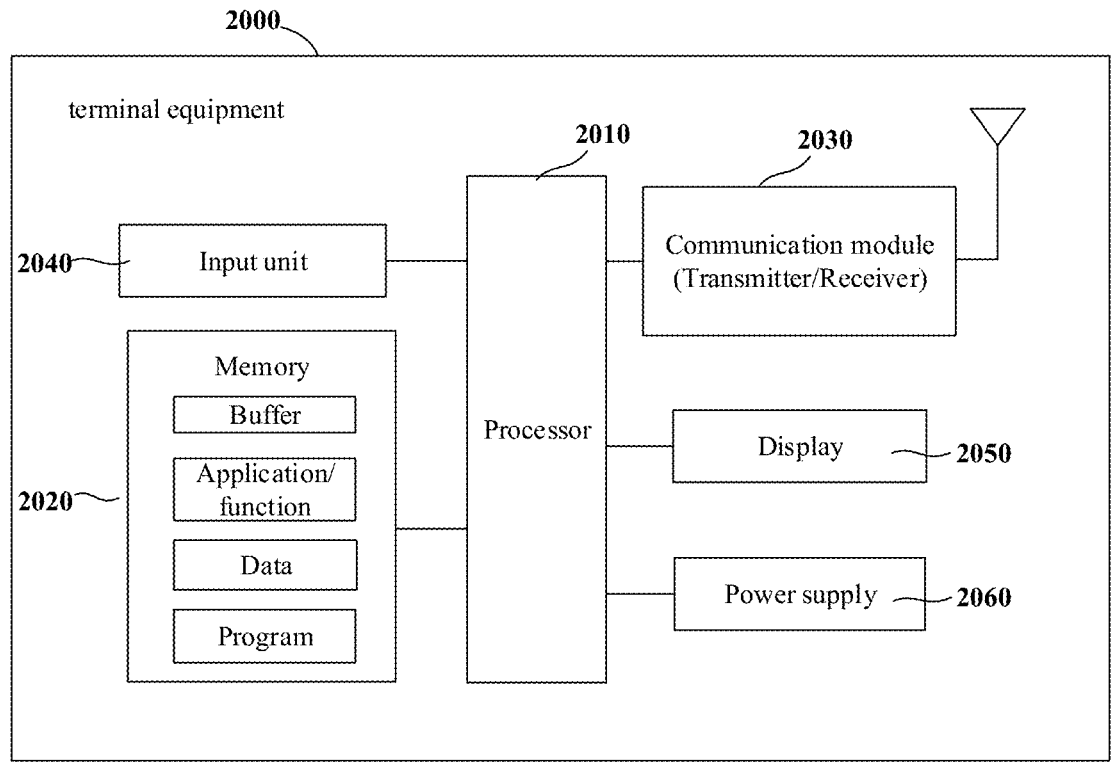
FIG. 20 is a block diagram of a systematic structure of the terminal equipment of Embodiment 6 of this disclosure.

FIG. 20 is a block diagram of a systematic structure of the terminal equipment of Embodiment 6 of this disclosure. As shown in FIG. 20, a terminal equipment 2000 may include a processor 2010 and a memory 2020, the memory 2020 being coupled to the processor 2010. It should be noted that this figure is illustrative only, and other types of structures may also be used, so as to supplement or replace this structure and achieve a telecommunications function or other functions.

In one implementation, the functions of the apparatus for indicating an LBT failure may be integrated into the processor 2010.

The processor 2010 may be configured to: in a case where a lower layer or a higher layer determines that a first condition and/or a second condition are/is satisfied, when uplink transmission is blocked due to an LBT failure, notify or indicate the LBT failure by the lower layer to the higher layer, or start to notify or indicate the LBT failure by the lower layer to the higher layer; and/or, in a case where the lower layer or the higher layer determines that the first condition and/or a third condition are/is not satisfied, when uplink transmission is blocked due to an LBT failure, not notify or indicate the LBT failure by the lower layer to the higher layer, or stop notifying or indicating the LBT failure by the lower layer to the higher layer.

For example, the first condition includes at least one of the following that: the terminal equipment is an NR-U terminal; the terminal equipment is an NR terminal; the terminal equipment is an NR-U terminal or an NR terminal; the uplink transmission or the terminal equipment performs a shared spectrum channel access operation; the uplink transmission is an uplink transmission scheduled or configured by a network device; the uplink transmission is not license assisted access (LAA) or enhanced license assisted access (eLAA); the terminal equipment is not performing license assisted access or enhanced license assisted access; or the uplink transmission is not automatic uplink transmission.

For example, the second condition is that a higher layer parameter is configured and/or having a capability; and/or, the third condition is that a higher layer parameter is released or removed and/or having no capability.

For example, the higher layer parameter includes at least one of the following parameters: a parameter used for consistent LBT failure detection of shared spectrum channel access; a configuration parameter used for a scheduling request; or a configuration parameter used for a configured grant.

For example, the higher layer parameter is cell-specific or terminal equipment specific, and/or, when dual-connectivity (DC) is configured, the higher layer parameter is respectively configured in a master cell group (MCG) and a secondary cell group (SCG); and/or, when a supplementary uplink (SUL) is configured, the higher layer parameter is respectively configured for the supplementary uplink (SUL) and a normal uplink (NUL).

For example, the capability is a capability of NR operation in a shared spectrum channel and/or a capability of consistent LBT detection and recovery.

For example, the capability is specific for a terminal equipment, or specific for a cell, or specific for a frequency band or a frequency band combination.

For example, when the lower layer or the higher layer determines that the first condition and/or the second condition are/is satisfied and the lower layer determines that a fourth condition is satisfied, the lower layer notifies or indicates the LBT failure to the higher layer, or the lower layer starts to notify or indicate the LBT failure to the higher layer,
the fourth condition including at least one of the following that: the LBT failure is a failure of any LBT; the LBT failure is a failure of LBT performed for a random access preamble transmission; the LBT failure is a failure of LBT performed for a configured grant; or the LBT failure is a failure of LBT performed for a valid physical uplink control channel (PUCCH) resource of a scheduling request (SR).

For example, when the LBT failure is a failure of LBT performed for a random access preamble transmission, the channel to which the LBT corresponds is a physical random access channel (PRACH), and the LBT is LBT performed for a random access resource (RA/PRACH occasion) indicated by the higher layer; and when the LBT failure is a failure of LBT performed for the configured grant, the channel to which the LBT corresponds is a physical uplink shared channel (PUSCH), and the LBT is LBT performed for a configured grant indicated by the higher layer.

For example, the notifying or indicating the LBT failure includes: transmitting a notification or indication, or, transmitting a notification or indication and an object performing LBT.

For example, the transmitted notification or indication is one of the following: a generic notification or indication; a notification or indication for specific use; a notification or indication transmitted by the lower layer to the higher layer via different service access points or channels or paths; and a notification or indication provided to different higher layer procedures or functions or entities.

For example, the higher layer procedures or functions or entities refer to at least one of the following: consistent LBT failure detection, a random access procedure, random access preamble transmission, a hybrid automatic repeat request (HARQ), transmission of an uplink configured grant, or a scheduling request.

For example, the object performing the LBT is characterized by an uplink resource or an index corresponding to an uplink resource.

For example, the uplink resource includes at least one of a random access resource (RA/PRACH occasion), a valid PUCCH resource of a scheduling request (SR), or a configured grant.

For example, the processor 2010 may further be configured to: when the higher layer is notified or indicated, or when the higher layer is not notified or indicated, increment a counter by 1 or not change the counter or suspend the counter, or start or restart a timer, or trigger the terminal equipment or the higher layer to execute a procedure.

For example, the counter is one of the following counters: a counter used for counting the number of scheduling requests; a counter used for applying or suspending power ramping; and a counter used for consistent LBT failure detection.

For example, the procedure triggering the terminal equipment or the higher layer to perform is a random access procedure or a random access resource selection procedure.

For example, when the higher layer determines that the first condition and/or the second condition is/are satisfied, the processor 2010 may further be configured to: transmit a notification or an indication or a request by the higher layer to the lower layer, and based on the notification or the indication or the request, when uplink transmission is blocked due to an LBT failure, notify or indicate the LBT failure by the lower layer to the higher layer, or start to notify or indicate the LBT failure by the lower layer to the higher layer.

For example, when the higher layer determines that the first condition and/or the third condition are/is not satisfied, the processor 2010 may further be configured to: transmit a notification or an indication or a request by the higher layer to the lower layer, and based on the notification or the indication or the request, when uplink transmission is blocked due to an LBT failure, not notify or indicate the LBT failure by the lower layer to the higher layer, or stop notifying or indicating the LBT failure by the lower layer to the higher layer.

For example, the notification or indication or request includes: transmitting a notification or an indication, or, transmitting a notification or an indication and an object executing the LBT.

For example, the transmitted notification or indication is one of the following: a generic notification or indication; a notification or indication for specific use; a notification or indication transmitted by the lower layer to the higher layer via different service access points (SAPs) or channels or paths; and a notification or indication or request from different higher layer procedures or functions or entities.

For example, the higher layer procedures or functions or entities refer to at least one of the following: consistent LBT failure detection, a random access procedure, random access preamble transmission, a hybrid automatic repeat request (HARQ), transmission of an uplink configured grant, or a scheduling request.

For example, the object performing the LBT is characterized by an uplink resource or an index corresponding to an uplink resource.

For example, the uplink resource includes at least one of a random access resource (RA/PRACH occasion), a valid PUCCH resource of a scheduling request, or a configured grant.

For example, when a counter is maintained, that is, when it is determined that a counter is incremented by 1 or unchanged or suspended, or, when a timer is maintained, that is, it is determined to start or restart a timer, or when it is determined whether the terminal equipment or the higher layer is triggered to execute a procedure, the higher layer transmits the notification or indication or request to the lower layer.

For example, the counter is one of the following counters: a counter used for counting the number of scheduling requests; a counter used for applying or suspending power ramping; and a counter used for consistent LBT failure detection; the timer is a timer for a configured grant (CG), or the timer is a timer for consistent LBT failure detection; and the procedure triggering the terminal equipment or the higher layer to perform is a random access procedure or a random access resource selection procedure.

For example, the lower layer is a physical layer, and the higher layer is a media access control (MAC) layer.

In another implementation, the apparatus for indicating an LBT failure and the processor 2010 may be configured separately; for example, the apparatus for indicating an LBT failure may be configured as a chip connected to the processor 2010, and the functions of the apparatus for indicating an LBT failure are executed under control of the processor 2010.

As shown in FIG. 20, the terminal equipment 2000 may further include a communication module 2030, an input unit 2040, a display 2050, and a power supply 2060. It should be noted that the terminal equipment 2000 does not necessarily include all the parts shown in FIG. 20; and furthermore, the terminal equipment 2000 may include parts not shown in FIG. 20, and the related art may be referred to.

As shown in FIG. 20, the processor 2010 is sometimes referred to as a controller or an operational control, which may include a microprocessor or other processor devices and/or logic devices. The processor 2010 receives input and controls operations of components of the terminal equipment 2000.

The memory 2020 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2010 may execute programs stored in the memory 2020, so as to realize information storage or processing, etc. Functions of other parts are similar to those of the related art, which shall not be described herein any further. The parts of the terminal equipment 2000 may be realized by specific hardware, firmware, software, or any combination thereof, without departing from the scope of this disclosure.

It can be seen from the above embodiment that the lower layer or the higher layer first determines whether relevant conditions are satisfied, and based on a result of determination, when the uplink transmission is blocked due to the LBT failure, determines whether the lower layer notifies or indicates the LBT failure to the higher layer, or determines whether the lower layer starts to notify or indicate the LBT failure or stops notifying or indicating the LBT failure to the higher layer, thereby lowering power consumption of the terminal equipment.

Embodiment 7

The embodiment of this disclosure provides a network device, including the apparatus for indicating an LBT failure as described in Embodiment 5.

Figure 21:
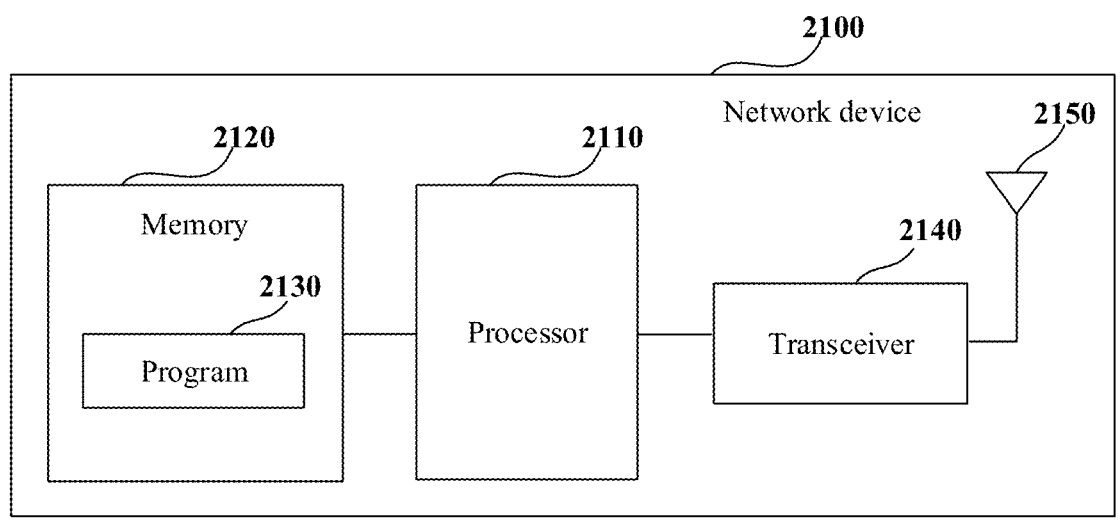
FIG. 21 is a block diagram of a systematic structure of the network device of Embodiment 7 of this disclosure.

FIG. 21 is a block diagram of a systematic structure of the network device of Embodiment 7 of this disclosure. As shown in FIG. 21, a network device 2100 may include a processor 2110 and a memory 2120, the memory 2120 being coupled to the processor 2110. The memory 2120 may store various data, and furthermore, it may store a program 2130 for data processing, and execute the program 2130 under control of the processor 2110, so as to receive various information transmitted by a terminal equipment, and transmit various information to the terminal equipment.

In one implementation, the functions of the apparatus for indicating an LBT failure may be integrated into the processor 2110. The processor 2110 may be configured to: configure a higher layer parameter for a terminal equipment, the higher layer parameter being used by the terminal equipment for determining whether a lower layer notifies or indicates an LBT failure to a higher layer.

For example, the higher layer parameter is further used by the terminal equipment for determining whether the higher layer transmits a notification or an indication or a request to the lower layer.

For example, the higher layer parameter includes at least one of the following parameters: a parameter used for consistent LBT failure detection of shared spectrum channel access; a configuration parameter used for a scheduling request; or a configuration parameter used for a configured grant.

For example, the higher layer parameter is specific for a cell, or specific for a terminal equipment; and/or when dual-connectivity (DC) is configured, the higher layer parameter is configured respectively in a master cell group (MCG) and a secondary cell group (SCG); and/or when a supplementary uplink (SUL) is configured, the higher layer parameter is configured respectively in the supplementary uplink (SUL) and a normal uplink (NUL).

In another implementation, the apparatus for indicating an LBT failure and the processor 2110 may be configured separately; for example, the apparatus for indicating an LBT failure may be configured as a chip connected to the processor 2110, and the functions of the apparatus for indicating an LBT failure are executed under control of the processor 2110.

Furthermore, as shown in FIG. 21, the network device 2100 may include a transceiver 2140, and an antenna 2150, etc. Functions of the above components are similar to those in the related art, and shall not be described herein any further. It should be noted that the network device 2100 does not necessarily include all the parts shown in FIG. 21. Furthermore, the network device 2100 may include parts not shown in FIG. 21, and the related art may be referred to.

It can be seen from the above embodiment that the network device configures the terminal equipment with the higher layer parameter for use by the terminal equipment to determine whether the lower layer notifies or indicates the LBT failure to the higher layer. Hence, the lower layer or the higher layer first determines whether related conditions are satisfied, and then based on a result of determination, when the transmission is blocked due to the LBT failure, determines whether the lower layer notifies or indicates the LBT failure to the higher layer, or determines whether the lower layer starts or stops notifying or indicating the LBT failure to the higher layer, which may reduce the interaction between the lower layer and the higher layer, thereby lowering the power consumption of the terminal equipment.

Embodiment 8

The embodiment of this disclosure provides a communications system, including the terminal equipment described in Embodiment 6 and/or the network device described Embodiment 7.

For example, reference may be made to FIG. 1 for a structure of the communications system. As shown in FIG. 1, the communications system 100 includes a network device 101 and a terminal equipment 102. The terminal equipment 102 is identical to the terminal equipment described in Embodiment 6, and the network device 101 is identical to the network device described in Embodiment 7, with repeated contents being not going to be described herein any further.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 18 may either correspond to software modules of procedures of a computer program, or correspond to hardware modules. Such software modules may respectively correspond to the steps shown in FIG. 4. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 18 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 18 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments this disclosure, following supplements are further disclosed.

Supplement 1

1. An apparatus for indicating an LBT failure, applicable to a terminal equipment, the apparatus including:
 a first indicating unit configured to, in a case where a lower layer or a higher layer determines that a first condition and/or a second condition are/is satisfied, when uplink transmission is blocked due to an LBT failure, notify or indicate the LBT failure by the lower layer to the higher layer, or start to notify or indicate the LBT failure by the lower layer to the higher layer; and/or
 a second indicating unit configured to, in a case where the lower layer or the higher layer determines that the first condition and/or a third condition are/is not satisfied, when uplink transmission is blocked due to an LBT failure, not notify or indicate the LBT failure by the lower layer to the higher layer, or stop notifying or indicating the LBT failure by the lower layer to the higher layer.

2. The apparatus according to supplement 1, wherein the first condition includes at least one of the following that:
 the terminal equipment is an NR-U terminal;
 the terminal equipment is an NR terminal;
 the terminal equipment is an NR-U terminal or an NR terminal;
 the uplink transmission or the terminal equipment performs a shared spectrum channel access operation;
 the uplink transmission is an uplink transmission scheduled or configured by a network device;
 the uplink transmission is not license assisted access (LAA) or enhanced license assisted access (eLAA);
 the terminal equipment is not performing license assisted access or enhanced license assisted access; or
 the uplink transmission is not automatic uplink transmission.

3. The apparatus according to supplement 1, wherein,
 the second condition is that a higher layer parameter is configured and/or having a capability; and/or
 the third condition is that a higher layer parameter is released or removed and/or having no capability.

4. The apparatus according to supplement 3, wherein the higher layer parameter includes at least one of the following parameters:
 a parameter used for consistent LBT failure detection of shared spectrum channel access;
 a configuration parameter used for a scheduling request; and
 a configuration parameter used for a configured grant.

5. The apparatus according to supplement 3 or 4, wherein,
 the higher layer parameter is cell-specific or terminal equipment-specific; and/or,
 when dual-connectivity (DC) is configured, the higher layer parameter is respectively configured in a master cell group (MCG) and a secondary cell group (SCG); and/or,
 when a supplementary uplink (SUL) is configured, the higher layer parameter is respectively configured for the supplementary uplink (SUL) and a normal uplink (NUL).

6. The apparatus according to supplement 3, wherein,
 the capability is a capability of NR operation in a shared spectrum channel and/or a capability of consistent LBT detection and recovery.

7. The apparatus according to supplement 3 or 6, wherein, the capability is specific for a terminal equipment, or specific for a cell, or specific for a frequency band or a frequency band combination.

8. The apparatus according to supplement 1, wherein for the first indicating unit, when the lower layer or the higher layer determines that the first condition and/or the second condition are/is satisfied and the lower layer determines that a fourth condition is satisfied, the lower layer notifies or indicates the LBT failure to the higher layer, or the lower layer starts to notify or indicate the LBT failure to the higher layer,
the fourth condition including at least one of the following that:
the LBT failure is a failure of any LBT;
the LBT failure is a failure of LBT performed for a random access preamble transmission;
the LBT failure is a failure of LBT performed for a configured grant; or
the LBT failure is a failure of LBT performed for a valid physical uplink control channel (PUCCH) resource of a scheduling request (SR).

9. The apparatus according to supplement 8, wherein, when the LBT failure is a failure of LBT performed for a random access preamble transmission, a channel to which the LBT corresponds is a physical random access channel (PRACH), and the LBT is LBT performed on the random access resource (RA/PRACH occasion) instructed by the higher layer;
and when the LBT failure is a failure of LBT performed for a configured grant, a channel to which the LBT corresponds is a physical uplink shared channel (PUSCH), and the LBT is LBT performed on the configured grant signaled by the higher layer.

10. The apparatus according to supplement 1, wherein the first indicating unit is configured to transmit a notification or an indication, or transmit a notification or an indication and an object executing LBT.

11. The apparatus according to supplement 10, wherein the transmitted notification or indication is one of the following:
a generic notification or indication;
a notification or indication for specific use;
a notification or indication transmitted by the lower layer to the higher layer via different service access points or channels or paths; and
a notification or indication provided to different higher layer procedures or functions or entities.

12. The apparatus according to supplement 11, wherein, the higher layer procedures or functions or entities refer to at least one of the following: consistent LBT failure detection, a random access procedure, random access preamble transmission, a hybrid automatic repeat request (HARQ), transmission of an uplink configured grant, or a scheduling request.

13. The apparatus according to supplement 10, wherein, the object performing the LBT is characterized by an uplink resource or an index corresponding to an uplink resource.

14. The apparatus according to supplement 13, wherein, the uplink resource includes at least one of a random access resource (RA/PRACH occasion), a valid PUCCH resource of a scheduling request, or a configured grant.

15. The apparatus according to supplement 1, wherein the apparatus further includes:
a first processing unit configure to, when the higher layer is notified or indicated, or when the higher layer is not notified or indicated, increment a counter by 1 or not change the counter or suspend the counter, or start or restart a timer, or trigger the terminal equipment or the higher layer to execute a procedure.

16. The apparatus according to supplement 15, wherein the counter is one of the following counters:
a counter used for counting the number of scheduling requests;
a counter used for applying or suspending power ramping; and
a counter used for consistent LBT failure detection.

17. The apparatus according to supplement 15, wherein, the timer is a timer used for a configured grant (CG) or a timer used for consistent LBT failure detection.

18. The apparatus according to supplement 15, wherein, the procedure triggering the terminal equipment or the higher layer to perform is a random access procedure or a random access resource selection procedure.

19. The apparatus according to any one of supplements 1-18, wherein,
when the higher layer determines that the first condition and/or the second condition are/is satisfied, the apparatus further includes:
a third indicating unit configured to transmit a notification or an indication or a request by the higher layer to the lower layer, and based on the notification or the indication or the request, when uplink transmission is blocked due to an LBT failure, notify or indicate the LBT failure by the lower layer to the higher layer, or start to notify or indicate the LBT failure by the lower layer to the higher layer.

20. The apparatus according to any one of supplements 1-19, wherein,
when the higher layer determines that the first condition and/or the third condition are/is not satisfied, the apparatus further includes:
a fourth indicating unit configured to transmit a notification or an indication or a request by the higher layer to the lower layer, and based on the notification or the indication or the request, when uplink transmission is blocked due to an LBT failure, not notify or indicate the LBT failure by the lower layer to the higher layer, or stop notifying or indicating the LBT failure by the lower layer to the higher layer.

21. The apparatus according to supplement 19 or 20, wherein the fourth indicating unit is configured to transmit a notification or an indication or a request, or transmit a notification or an indication or a request and an object executing the LBT.

22. The apparatus according to supplement 21, wherein the transmitted notification or indication or request is one of the following:
a generic notification or indication;
a notification or indication for specific use;
a notification or indication transmitted by the lower layer to the higher layer via different service access points (SAPs) or channels or paths; and
a notification or indication or request from different higher layer procedures or functions or entities.

23. The apparatus according to supplement 22, wherein, the higher layer procedures or functions or entities refer to at least one of the following: consistent LBT failure detection, a random access procedure, random access preamble transmission, a hybrid automatic repeat request (HARQ), transmission of an uplink configured grant, or a scheduling request.

24. The apparatus according to supplement 21, wherein, the object performing the LBT is characterized by an uplink resource or an index corresponding to an uplink resource.

25. The apparatus according to supplement 24, wherein, the uplink resource includes at least one of a random access resource (RA/PRACH occasion), a valid PUCCH resource of a scheduling request, or a configured grant.

26. The apparatus according to supplement 19 or 20, wherein,
when a counter is maintained, that is, when it is determined that a counter is incremented by 1 or unchanged or suspended, or, when a timer is maintained, that is, it is determined to start or restart a timer, or when it is determined whether the terminal equipment or the higher layer is triggered to execute a procedure, the third indicating unit or the fourth indicating unit is configured for the higher layer to transmit the notification or indication or request to the lower layer.

27. The apparatus according to supplement 26, wherein, the counter is one of the following counters: a counter used for counting the number of scheduling requests; a counter used for applying or suspending power ramping; and a counter used for consistent LBT failure detection;
the timer is a timer used for a configured grant or a timer used for consistent LBT failure detection;
and the procedure triggering the terminal equipment or the higher layer to perform is a random access procedure or a random access resource selection procedure.

28. The apparatus according to any one of supplements 1-27, wherein,
the lower layer is a physical layer, and the higher layer is a media access control (MAC) layer.

29. An apparatus for indicating an LBT failure, applicable to a network device, the apparatus including:
a configuring unit configured to configure a higher layer parameter for a terminal equipment,
the higher layer parameter being used by the terminal equipment for determining whether a lower layer notifies or indicates an LBT failure to a higher layer.

30. The apparatus according to supplement 29, wherein, the higher layer parameter is further used by the terminal equipment for determining whether the higher layer transmits a notification or an indication or a request to the lower layer.

31. The apparatus according to supplement 29, wherein that the higher layer parameter is used by the terminal equipment for determining whether the lower layer notifies or indicates the LBT failure to the higher layer includes:
when uplink transmission is blocked due to the LBT failure, according to a second condition and/or a third condition, determining by the terminal equipment whether the lower layer notifies or indicates the LBT failure to the higher layer, or whether the lower layer starts to notify or indicate the LBT failure to the higher layer or stops notifying or indicating the LBT failure to the higher layer,
the second condition being that the higher layer parameter is configured and/or having an capability, and/or the third condition being that the higher layer parameter is released or removed and/or having no capability.

32. The apparatus according to any one of supplements 29-31, wherein,
the higher layer parameter includes at least one of the following parameters:
a parameter used for consistent LBT failure detection of shared spectrum channel access;
a configuration parameter used for a scheduling request; or
a configuration parameter used for a configured grant.

33. The apparatus according to any one of supplements 29-32, wherein,
the higher layer parameter is specific for a cell, or specific for a terminal equipment; and/or
when dual-connectivity (DC) is configured, the higher layer parameter is configured respectively in a master cell group (MCG) and a secondary cell group (SCG); and/or
when a supplementary uplink (SUL) is configured, the higher layer parameter is configured respectively in the supplementary uplink (SUL) and a normal uplink (NUL).

34. A terminal equipment, including the apparatus as described in any one of supplements 1-28.

35. A network device, including the apparatus as described in any one of supplements 29-33.

36. A communications system, including the terminal equipment as described in supplement 34 and/or the network device as described in supplement 35.

Supplement 2

1. A method for indicating an LBT failure, applicable to a terminal equipment, the method including:
in a case where a lower layer or a higher layer determines that a first condition and/or a second condition are/is satisfied, when uplink transmission is blocked due to an LBT failure, notifying or indicating the LBT failure by the lower layer to the higher layer, or starting to notify or indicate the LBT failure by the lower layer to the higher layer; and/or
in a case where the lower layer or the higher layer determines that the first condition and/or a third condition are/is not satisfied, when uplink transmission is blocked due to an LBT failure, not notifying or indicating the LBT failure by the lower layer to the higher layer, or stopping notifying or indicating the LBT failure by the lower layer to the higher layer.

2. The method according to supplement 1, wherein the first condition includes at least one of the following that:
the terminal equipment is an NR-U terminal;
the terminal equipment is an NR terminal;
the terminal equipment is an NR-U terminal or an NR terminal;
the uplink transmission or the terminal equipment performs a shared spectrum channel access operation;
the uplink transmission is an uplink transmission scheduled or configured by a network device;
the uplink transmission is not license assisted access (LAA) or enhanced license assisted access (eLAA);
the terminal equipment is not performing license assisted access or enhanced license assisted access; or
the uplink transmission is not automatic uplink transmission.

3. The method according to supplement 1, wherein,
the second condition is that a higher layer parameter is configured and/or having an capability; and/or
the third condition is that a higher layer parameter is released or removed and/or having no capability.

4. The method according to supplement 3, wherein the higher layer parameter includes at least one of the following parameters:

a parameter used for consistent LBT failure detection of shared spectrum channel access;
a configuration parameter used for a scheduling request; or
a configuration parameter used for a configured grant.

5. The method according to supplement 3 or 4, wherein,
the higher layer parameter is cell-specific or terminal equipment-specific; and/or,
when dual-connectivity (DC) is configured, the higher layer parameter is respectively configured in a master cell group (MCG) and a secondary cell group (SCG); and/or,
when a supplementary uplink (SUL) is configured, the higher layer parameter is respectively configured for the supplementary uplink (SUL) and a normal uplink (NUL).

6. The method according to supplement 3, wherein,
the capability is a capability of NR operation in a shared spectrum channel and/or a capability of consistent LBT detection and recovery.

7. The method according to supplement 3 or 6, wherein,
the capability is specific for a terminal equipment, or specific for a cell, or specific for a frequency band or a frequency band combination.

8. The method according to supplement 1, wherein when the lower layer or the higher layer determines that the first condition and/or the second condition are/is satisfied and the lower layer determines that a fourth condition is satisfied, the lower layer notifies or indicates the LBT failure to the higher layer, or the lower layer starts to notify or indicate the LBT failure to the higher layer,
the fourth condition including at least one of the following that:
the LBT failure is a failure of any LBT;
the LBT failure is a failure of LBT performed for a random access preamble transmission;
the LBT failure is a failure of LBT performed for a configured grant; or
the LBT failure is a failure of LBT performed for a valid physical uplink control channel (PUCCH) resource of a scheduling request (SR).

9. The method according to supplement 8, wherein,
when the LBT failure is a failure of LBT performed for a random access preamble transmission, a channel to which the LBT corresponds is a physical random access channel (PRACH), and the LBT is LBT performed on the random access resource (RA/PRACH occasion) instructed by the higher layer;
and when the LBT failure is a failure of LBT performed for a configured grant, a channel to which the LBT corresponds is a physical uplink shared channel (PUSCH), and the LBT is LBT performed on the configured grant signaled by the higher layer.

10. The method according to supplement 1, wherein the notifying or indicating the LBT failure includes:
transmitting a notification or an indication, or transmitting a notification or an indication and an object executing LBT.

11. The method according to supplement 10, wherein the transmitted notification or indication is one of the following:
a generic notification or indication;
a notification or indication for specific use;
a notification or indication transmitted by the lower layer to the higher layer via different service access points or channels or paths; and
a notification or indication provided to different higher layer procedures or functions or entities.

12. The method according to supplement 11, wherein,
the higher layer procedures or functions or entities refer to at least one of the following: consistent LBT failure detection, a random access procedure, random access preamble transmission, a hybrid automatic repeat request (HARQ), transmission of an uplink configured grant, or a scheduling request.

13. The method according to supplement 10, wherein,
the object performing the LBT is characterized by an uplink resource or an index corresponding to an uplink resource.

14. The method according to supplement 13, wherein,
the uplink resource includes at least one of a random access resource (RA/PRACH occasion), a valid PUCCH resource of a scheduling request, or a configured grant.

15. The method according to supplement 1, wherein the method further includes:
when the higher layer is notified or indicated, or when the higher layer is not notified or indicated,
incrementing a counter by 1 or not changing the counter or suspending the counter, or starting or restarting a timer, or triggering a terminal equipment or a higher layer to execute a procedure.

16. The method according to supplement 15, wherein the counter is one of the following counters:
a counter used for counting the number of scheduling requests;
a counter used for applying or suspending power ramping; and
a counter used for consistent LBT failure detection.

17. The method according to supplement 15, wherein,
the timer is a timer used for a configured grant (CG) or a timer used for consistent LBT failure detection.

18. The method according to supplement 15, wherein,
the procedure triggering the terminal equipment or the higher layer to perform is a random access procedure or a random access resource selection procedure.

19. The method according to any one of supplements 1-18, wherein,
when the higher layer determines that the first condition and/or the second condition are/is satisfied, the method further includes:
transmitting a notification or an indication or a request by the higher layer to the lower layer, and based on the notification or the indication or the request, when uplink transmission is blocked due to an LBT failure, notifying or indicating the LBT failure by the lower layer to the higher layer, or starting to notify or indicate the LBT failure by the lower layer to the higher layer.

20. The method according to any one of supplements 1-19, wherein,
when the higher layer determines that the first condition and/or the third condition are/is not satisfied, the method further includes:
transmitting a notification or an indication or a request by the higher layer to the lower layer, and based on the notification or the indication or the request, when uplink transmission is blocked due to an LBT failure, not notifying or indicating the LBT failure by the lower layer to the higher layer, or stopping notifying or indicating the LBT failure by the lower layer to the higher layer.

21. The method according to supplement 19 or 20, wherein the notification or indication or request includes:

transmitting a notification or an indication or a request, or transmitting a notification or an indication or a request and an object executing the LBT.

22. The method according to supplement 21, wherein the transmitted notification or indication or request is one of the following:
   a generic notification or indication;
   a notification or indication for specific use;
   a notification or indication transmitted by the lower layer to the higher layer via different service access points (SAPs) or channels or paths; and
   a notification or indication or request from different higher layer procedures or functions or entities.

23. The method according to supplement 22, wherein, the higher layer procedures or functions or entities refer to at least one of the following: consistent LBT failure detection, a random access procedure, random access preamble transmission, a hybrid automatic repeat request (HARQ), transmission of an uplink configured grant, or a scheduling request.

24. The method according to supplement 21, wherein, the object performing the LBT is characterized by an uplink resource or an index corresponding to an uplink resource.

25. The method according to supplement 24, wherein, the uplink resource includes at least one of a random access resource (RA/PRACH occasion), a valid PUCCH resource of a scheduling request, or a configured grant.

26. The method according to supplement 19 or 20, wherein,
   when a counter is maintained, that is, when it is determined that a counter is incremented by 1 or unchanged or suspended, or, when a timer is maintained, that is, it is determined to start or restart a timer, or when it is determined whether the terminal equipment or the higher layer is triggered to execute a procedure, the higher layer transmits the notification or indication or request to the lower layer.

27. The method according to supplement 26, wherein, the counter is one of the following counters: a counter used for counting the number of scheduling requests; a counter used for applying or suspending power ramping; and a counter used for consistent LBT failure detection;
   the timer is a timer used for a configured grant or a timer used for consistent LBT failure detection;
   and the procedure triggering the terminal equipment or the higher layer to perform is a random access procedure or a random access resource selection procedure.

28. The method according to any one of supplements 1-27, wherein,
   the lower layer is a physical layer, and the higher layer is a media access control (MAC) layer.

29. A method for indicating an LBT failure, applicable to a network device, the method including:
   configuring a higher layer parameter for a terminal equipment,
   the higher layer parameter being used by the terminal equipment for determining whether a lower layer notifies or indicates an LBT failure to a higher layer.

30. The method according to supplement 29, wherein, the higher layer parameter is further used by the terminal equipment for determining whether the higher layer transmits a notification or an indication or a request to the lower layer.

31. The method according to supplement 29, wherein that the higher layer parameter is used by the terminal equipment for determining whether the lower layer notifies or indicates the LBT failure to the higher layer includes:
   when uplink transmission is blocked due to the LBT failure, according to a second condition and/or a third condition, determining by the terminal equipment whether the lower layer notifies or indicates the LBT failure to the higher layer, or whether the lower layer starts to notify or indicate the LBT failure to the higher layer or stops notifying or indicating the LBT failure to the higher layer,
   the second condition being that the higher layer parameter is configured and/or having a capability, and/or the third condition being that the higher layer parameter is released or removed and/or having no capability.

32. The method according to any one of supplements 29-31, wherein,
   the higher layer parameter includes at least one of the following parameters:
   a parameter used for consistent LBT failure detection of shared spectrum channel access;
   a configuration parameter used for a scheduling request; or
   a configuration parameter used for a configured grant.

33. The method according to any one of supplements 29-32, wherein,
   the higher layer parameter is specific for a cell, or specific for a terminal equipment; and/or
   when dual-connectivity (DC) is configured, the higher layer parameter is configured respectively in a master cell group (MCG) and a secondary cell group (SCG); and/or
   when a supplementary uplink (SUL) is configured, the higher layer parameter is configured respectively in the supplementary uplink (SUL) and a normal uplink (NUL).

What is claimed is:

1. An apparatus for indicating a listen before talk (LBT) failure, applicable to a terminal equipment, the apparatus comprising:
   processor circuitry configured to:
      in a case where the terminal equipment performs a shared spectrum channel access operation, uplink transmission is an uplink transmission scheduled or configured by a network device, and the uplink transmission is not license assisted access (LAA) or enhanced license assisted access (eLAA), when the uplink transmission is blocked due to an LBT failure, notify the LBT failure by a lower layer to a higher layer; and
      when the higher layer is notified, trigger the higher layer to perform a random access (RA) resource selection procedure.

2. The apparatus according to claim 1, wherein the processor circuitry configured to:
   in a case where the terminal equipment performs a shared spectrum channel access operation, the uplink transmission is scheduled or configured by a gNB, when the uplink transmission is blocked due to an LBT failure, notify or indicate the LBT failure by the lower layer to the higher layer.

3. The apparatus according to claim 1, wherein for the processor circuitry, the case further comprises:
   a higher layer parameter is configured and/or having a capability.

4. The apparatus according to claim 3, wherein the higher layer parameter comprises at least one of the following parameters:
- a parameter used for consistent LBT failure detection of shared spectrum channel access;
- a configuration parameter used for a scheduling request; or
- a configuration parameter used for a configured grant.

5. The apparatus according to claim 3, wherein, the capability is a capability of new radio (NR) operation in a shared spectrum channel and/or a capability of consistent LBT detection and recovery.

6. The apparatus according to claim 3, wherein, the capability is specific for a terminal equipment, or specific for a cell, or specific for a frequency band or a frequency band combination.

7. The apparatus according to claim 1, wherein the processor circuitry configured to transmit a notification or an indication, or transmit a notification or an indication and an object executing LBT.

8. The apparatus according to claim 7, wherein the transmitted notification or indication is one of the following:
- a generic notification or indication;
- a notification or indication for specific use;
- a notification or indication transmitted by the lower layer to the higher layer via different service access points or channels or paths; and
- a notification or indication provided to different higher layer procedures or functions or entities.

9. The apparatus according to claim 1, wherein the processor circuitry is further configured to:
- when the higher layer is not notified, increment SR_COUNTER by 1, or start or restart a configured grant (CG) timer.

10. The apparatus according to claim 1, wherein the processor circuitry is further configured to, in a case where the lower layer or the higher layer determines that a first condition and/or a third condition are/is not satisfied, when uplink transmission is blocked due to an LBT failure, not notify or indicate the LBT failure by the lower layer to the higher layer, or stop notifying or indicating the LBT failure by the lower layer to the higher layer;
wherein, the third condition is that a higher layer parameter is released or removed and/or having no capability.

11. The apparatus according to claim 10, wherein the first condition comprises at least one of the following that:
- the terminal equipment is a new radio-unlicensed (NR-U) terminal;
- the terminal equipment is an NR terminal;
- the terminal equipment is an NR-U terminal or an NR terminal;
- the uplink transmission or the terminal equipment performs a shared spectrum channel access operation;
- the uplink transmission is an uplink transmission scheduled or configured by a network device;
- the uplink transmission is not license assisted access (LAA) or enhanced license assisted access (eLAA);
- the terminal equipment is not performing license assisted access or enhanced license assisted access; and
- the uplink transmission is not automatic uplink transmission.

12. The apparatus according to claim 1, wherein for the processor circuitry, the case further comprises:
- the lower layer determines that a fourth condition is satisfied, the lower layer notifies or indicates the LBT failure to the higher layer, or the lower layer starts to notify or indicate the LBT failure to the higher layer, the fourth condition comprising at least one of the following that:
  - the LBT failure is a failure of any LBT;
  - the LBT failure is a failure of LBT performed for a random access preamble transmission;
  - the LBT failure is a failure of LBT performed for a configured grant; and
  - the LBT failure is a failure of LBT performed for a valid physical uplink control channel (PUCCH) resource of a scheduling request (SR).

13. The apparatus according to claim 1, wherein, the processor circuitry is further configured to transmit a notification or an indication or a request by the higher layer to the lower layer, and based on the notification or the indication or the request, when uplink transmission is blocked due to an LBT failure, notify or indicate the LBT failure by the lower layer to the higher layer, or start to notify or indicate the LBT failure by the lower layer to the higher layer.

14. The apparatus according to claim 1, wherein, the processor circuitry is further configured to transmit a notification or an indication or a request by the higher layer to the lower layer, and based on the notification or the indication or the request, when uplink transmission is blocked due to an LBT failure, not notify or indicate the LBT failure by the lower layer to the higher layer, or stop notifying or indicating the LBT failure by the lower layer to the higher layer.

15. An apparatus for indicating a listen before talk (LBT) failure, applicable to a network device, the apparatus comprising:
processor circuitry configured to configure a higher layer parameter for a terminal equipment, the higher layer parameter being used by the terminal equipment for determining whether a lower layer notifies or indicates an LBT failure to a higher layer,
wherein,
the higher layer parameter is specific for a cell, or specific for a terminal equipment; and/or
when dual-connectivity (DC) is configured, the higher layer parameter is configured respectively in a master cell group (MCG) and a secondary cell group (SCG); and/or
when a supplementary uplink (SUL) is configured, the higher layer parameter is configured respectively in the supplementary uplink (SUL) and a normal uplink (NUL).

16. The apparatus according to claim 15, wherein, the higher layer parameter is further used by the terminal equipment for determining whether the higher layer transmits a notification, an indication or a request to the lower layer.

17. The apparatus according to claim 15, wherein that the higher layer parameter is used by the terminal equipment for determining whether the lower layer notifies or indicates the LBT failure to the higher layer comprises:
- when uplink transmission is blocked due to the LBT failure, determining by the terminal equipment according to a second condition and/or a third condition whether the lower layer notifies or indicates the LBT failure to the higher layer, or whether the lower layer starts to notify or indicate the LBT failure to the higher layer or stops notifying or indicating the LBT failure to the higher layer,
- the second condition being that the higher layer parameter is configured and/or having a capability, and/or the third condition being that the higher layer parameter is released or removed and/or having no capability.

18. The apparatus according to claim 15, wherein,
the higher layer parameter comprises at least one of the following parameters:
  a parameter used for consistent LBT failure detection of shared spectrum channel access;
  a configuration parameter used for a scheduling request; or
  a configuration parameter used for a configured grant.

19. A communications system, comprising:
a terminal equipment and/or a network device,
the terminal equipment comprising:
  processor circuitry configured to,
    in a case where the terminal equipment performs a shared spectrum channel access operation, uplink transmission is an uplink transmission scheduled or configured by a network device, and the uplink transmission is not license assisted access (LAA) or enhanced license assisted access (eLAA), when the uplink transmission is blocked due to an LBT failure, notify an LBT failure by a lower layer to a higher layer; and
    when the higher layer is notified, trigger the higher layer to perform a RA resource selection procedure, and
the network device comprising:
  processor circuitry configured to configure a higher layer parameter for terminal equipment, the higher layer parameter being used by the terminal equipment for determining whether a lower layer notifies or indicates an LBT failure to a higher layer,
wherein
  the higher layer parameter is specific for a cell, or specific for a terminal equipment; and/or
  when dual-connectivity (DC) is configured, the higher layer parameter is configured respectively in a master cell group (MCG) and a secondary cell group (SCG); and/or
  when a supplementary uplink (SUL) is configured, the higher layer parameter is configured respectively in the supplementary uplink (SUL) and a normal uplink (NUL).

* * * * *